May 7, 1935.     O. F. BAUER ET AL     2,000,209
MACHINE FOR PRODUCING GEARS
Filed Aug. 9, 1932      18 Sheets-Sheet 3

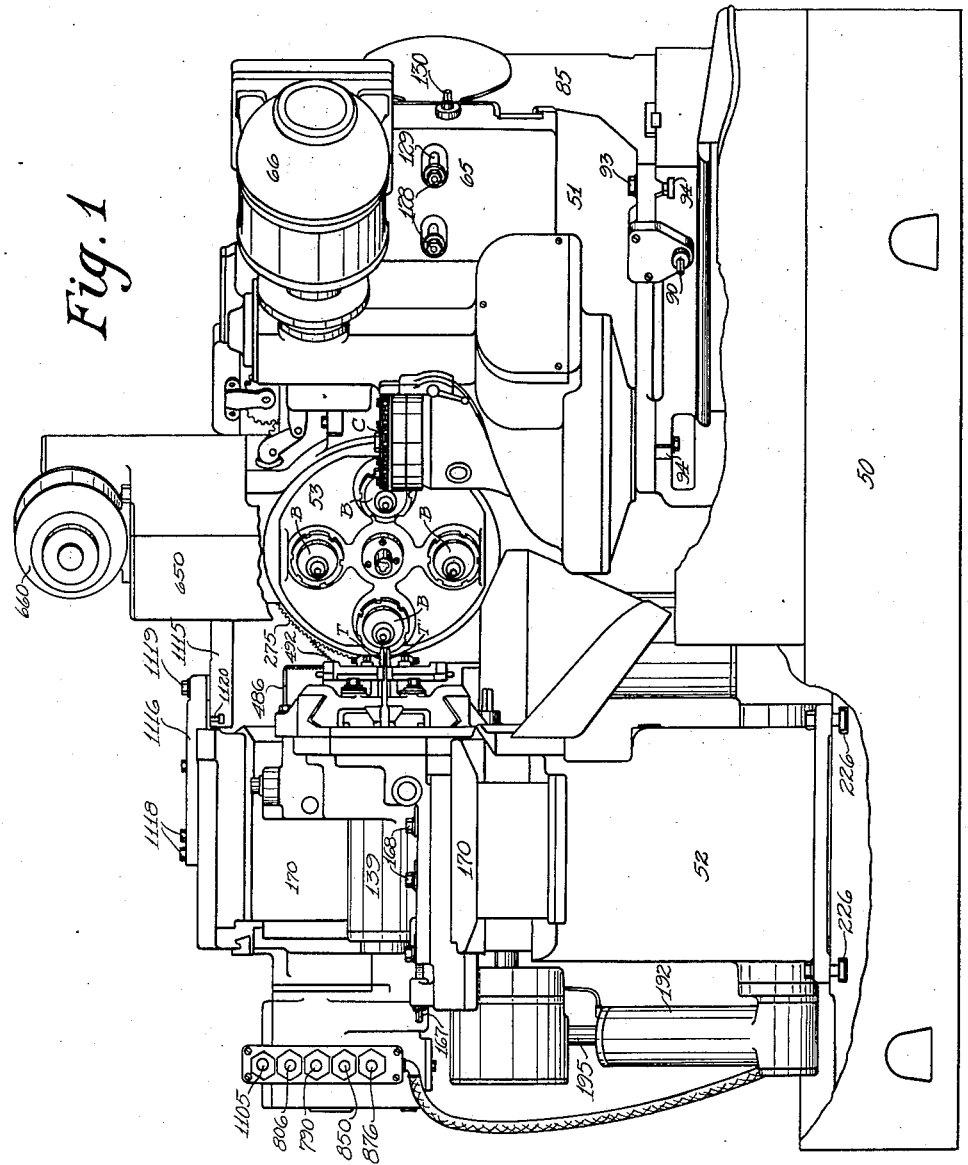

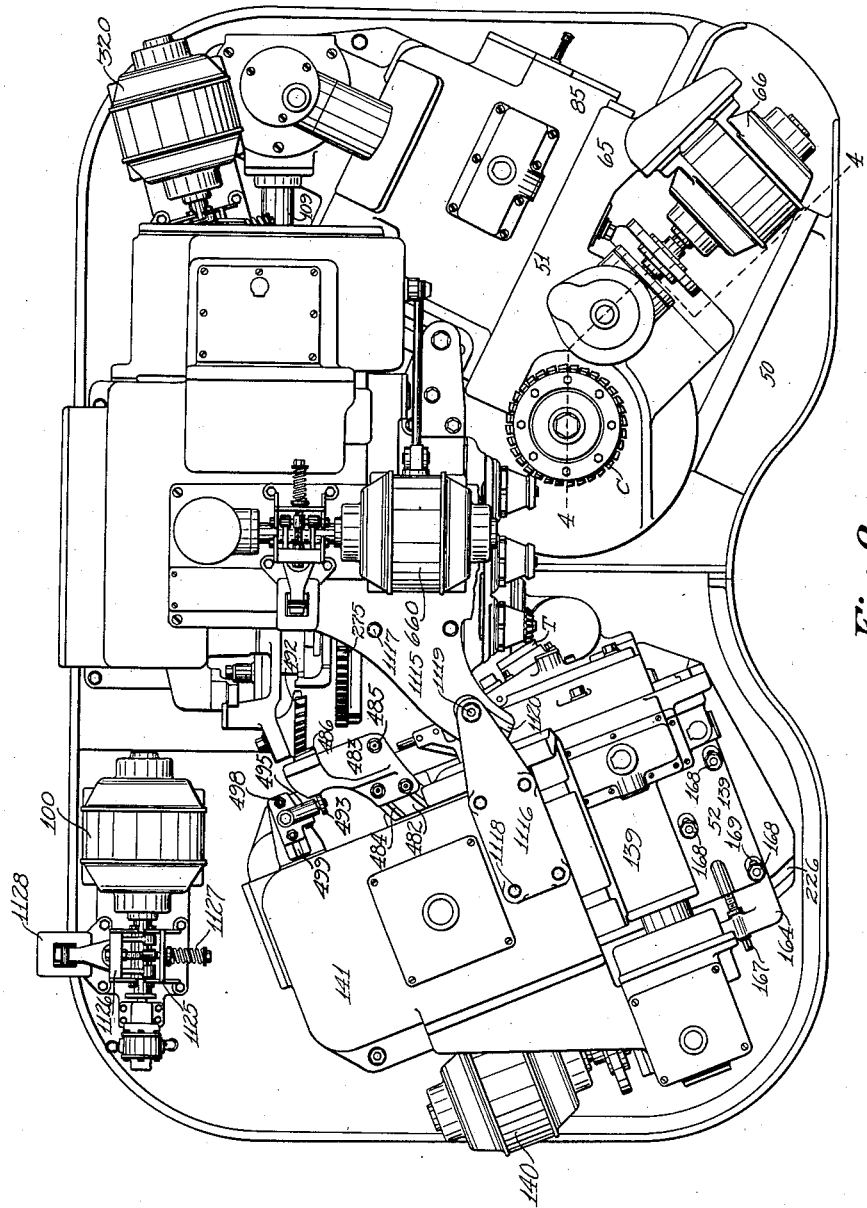

INVENTORS
O. F. Bauer and W. R. Carpenter
BY
ATTORNEY

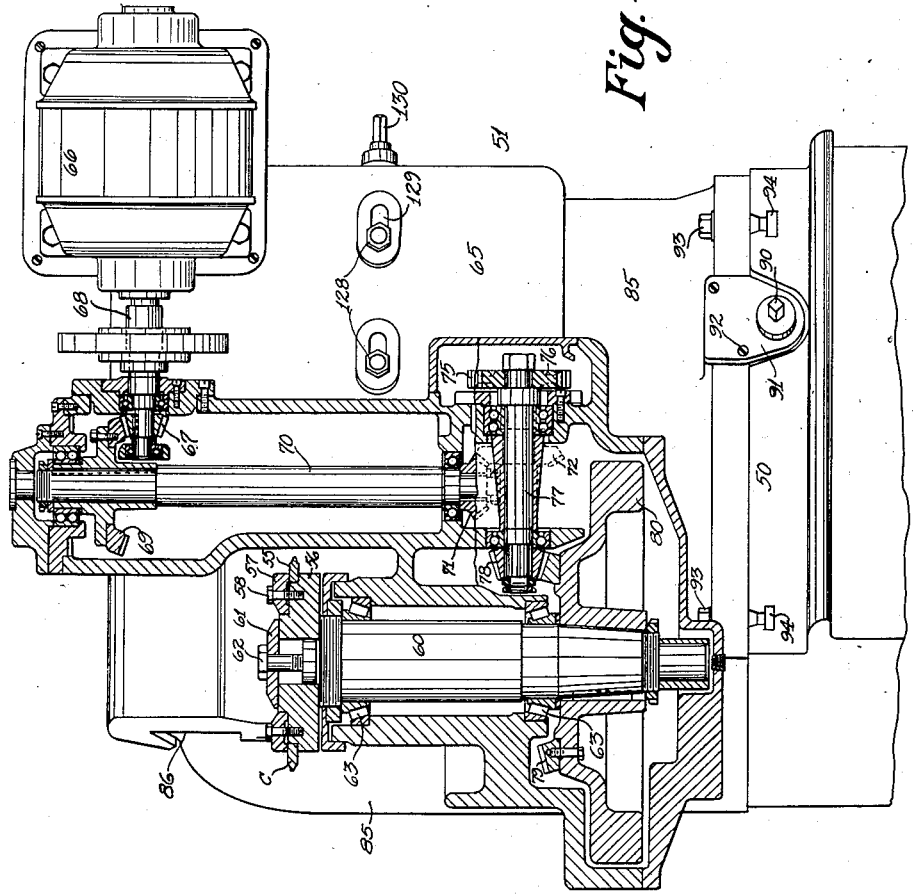

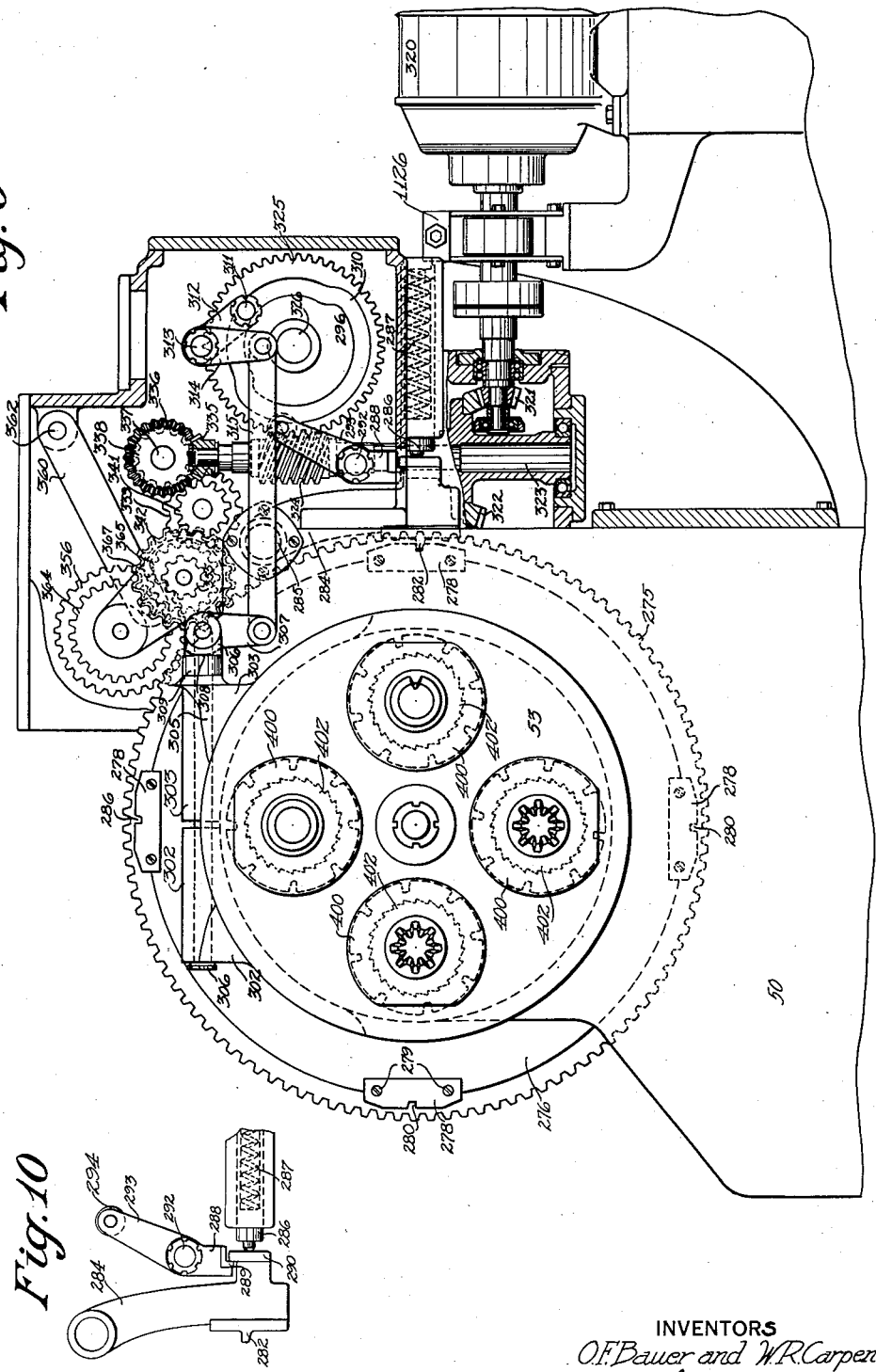

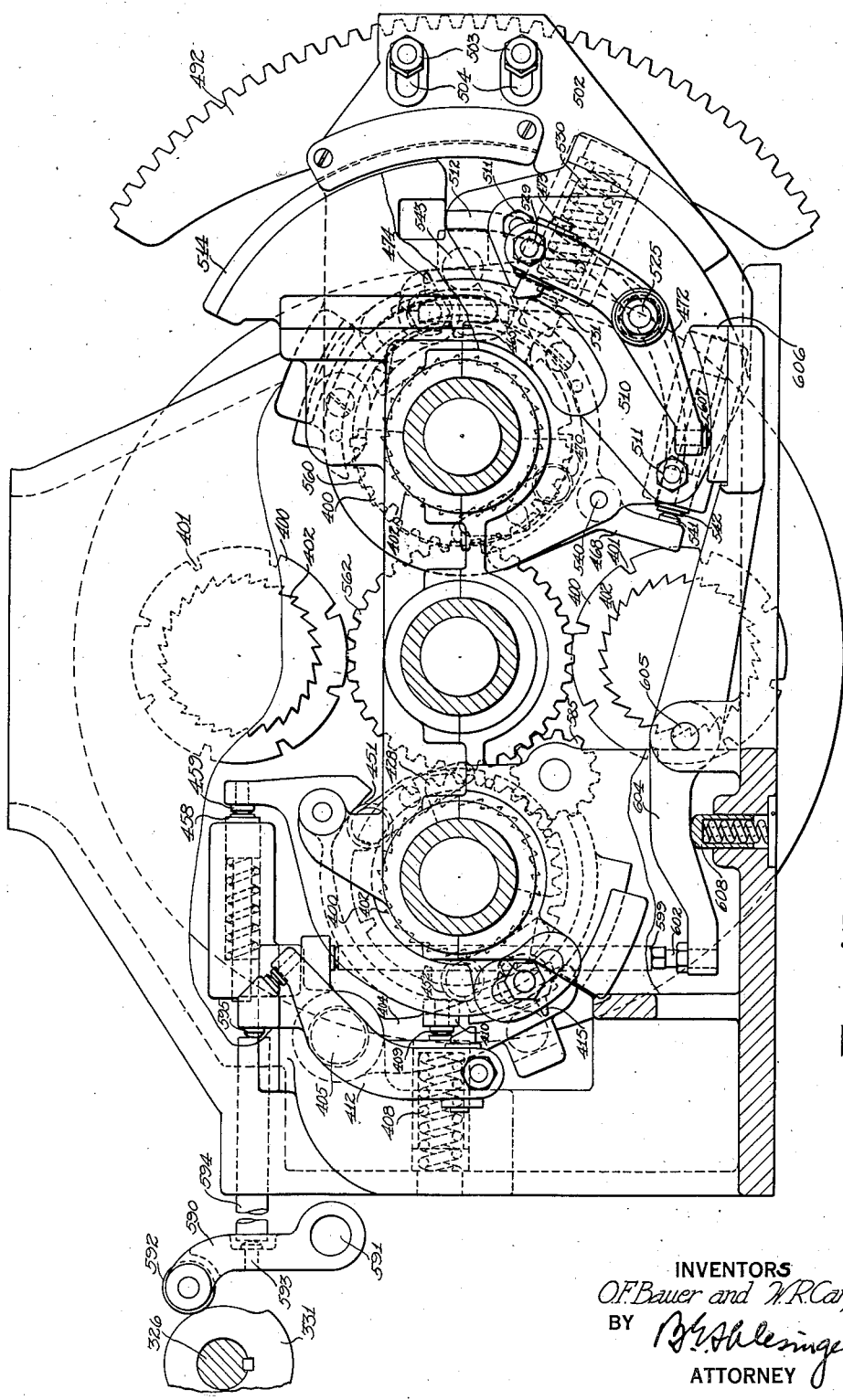

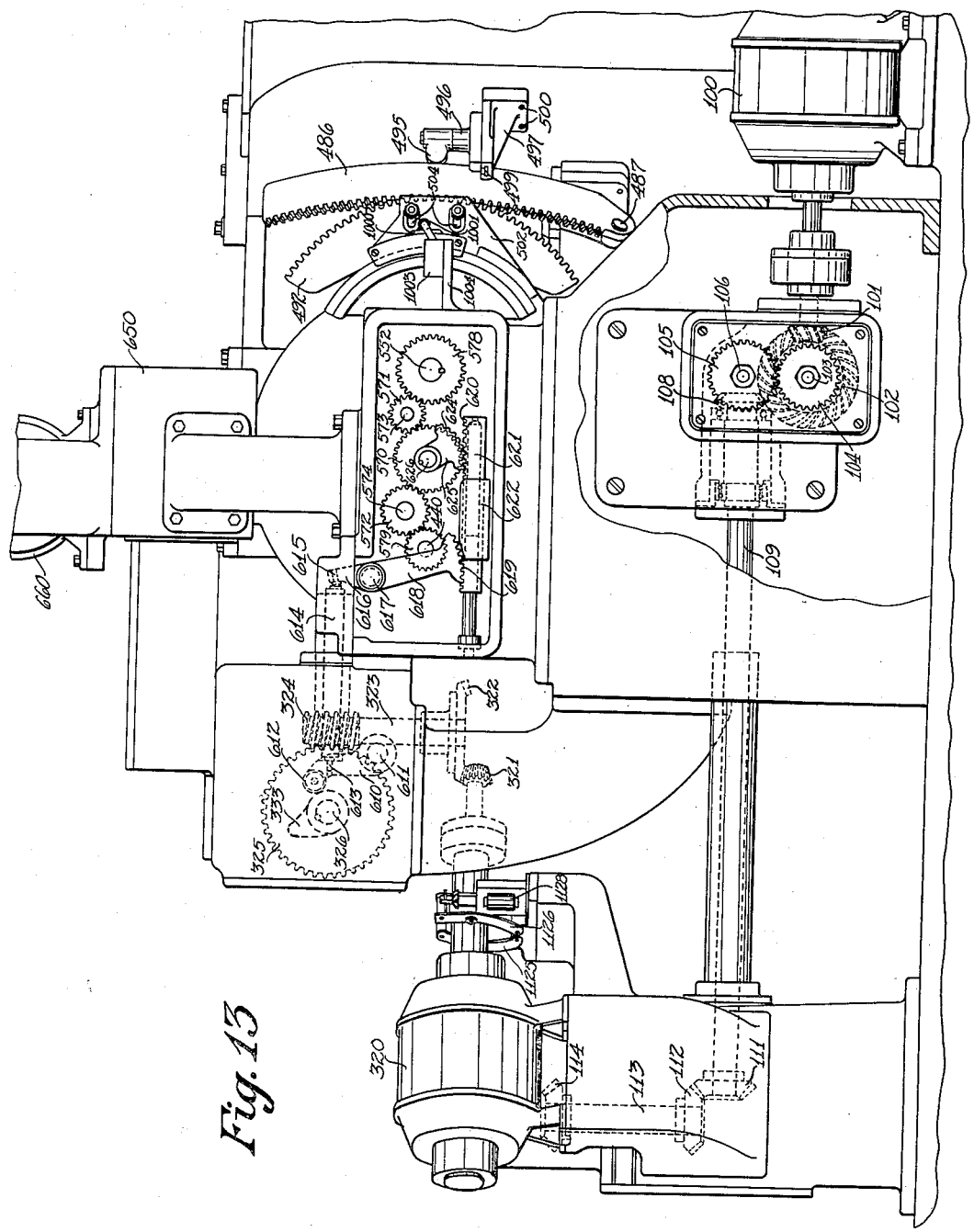

May 7, 1935.                    O. F. BAUER ET AL                    2,000,209
                              MACHINE FOR PRODUCING GEARS
                        Filed Aug. 9, 1932          18 Sheets-Sheet 12
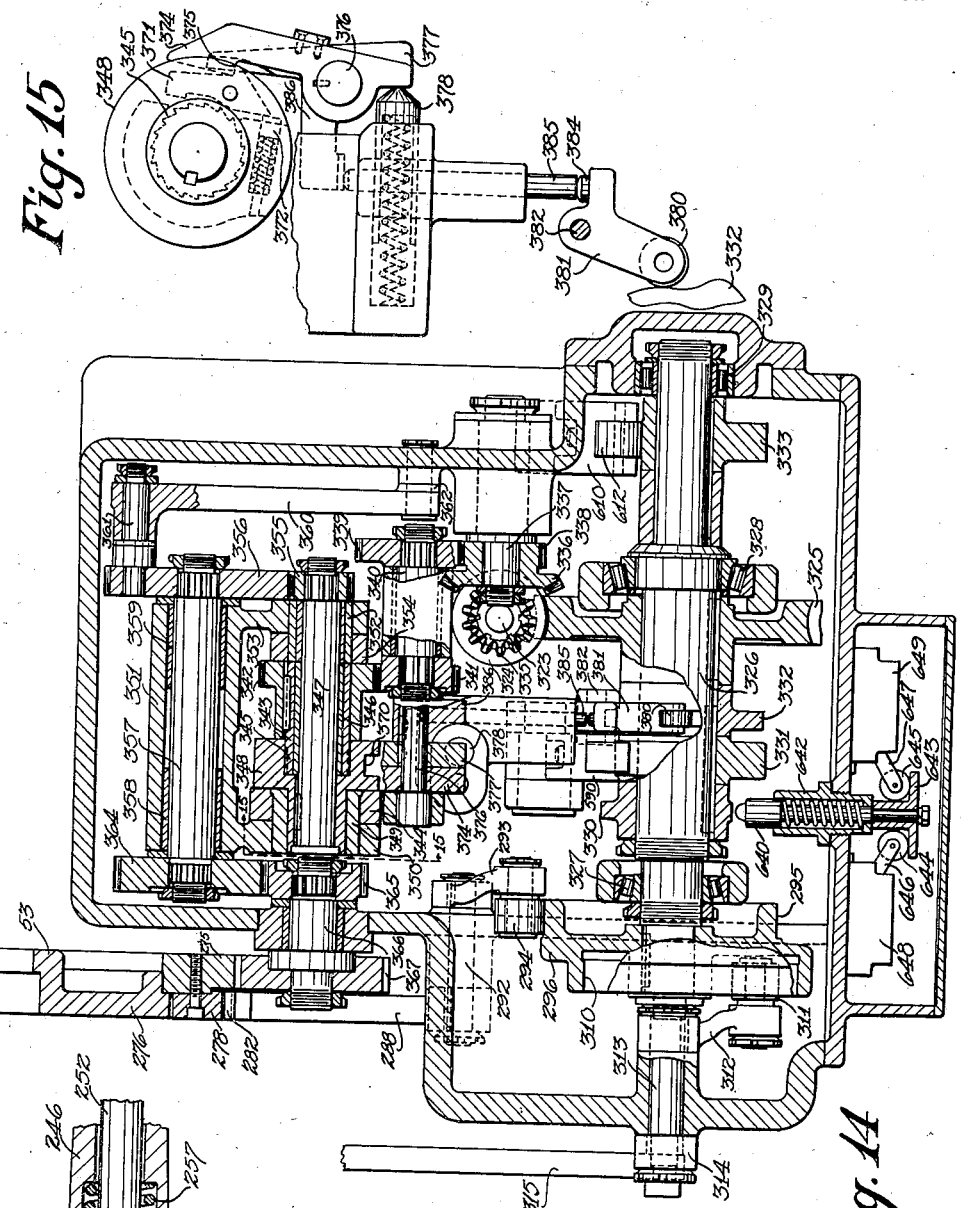
INVENTORS
O.F.Bauer and W.R.Carpenter
BY  G.Schlesinger
ATTORNEY May 7, 1935.　　　　O. F. BAUER ET AL　　　　2,000,209
MACHINE FOR PRODUCING GEARS
Filed Aug. 9, 1932　　　18 Sheets-Sheet 13
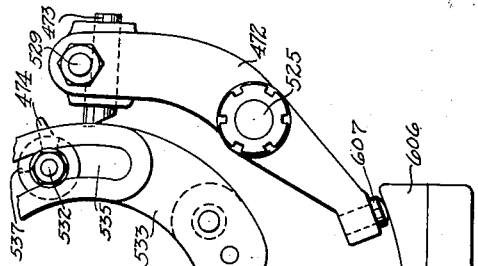
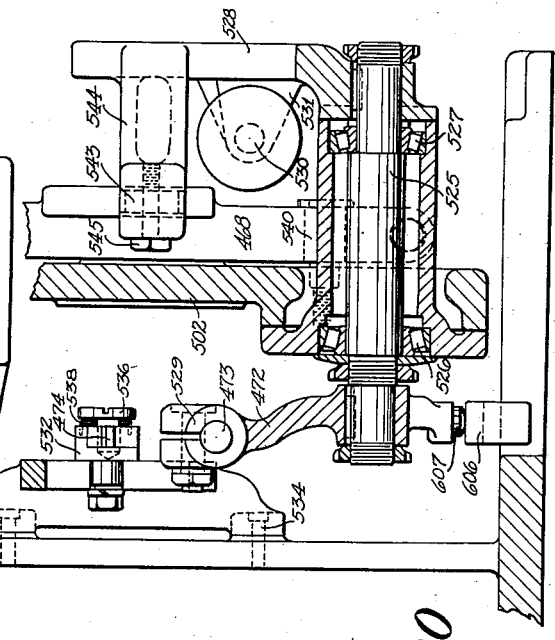
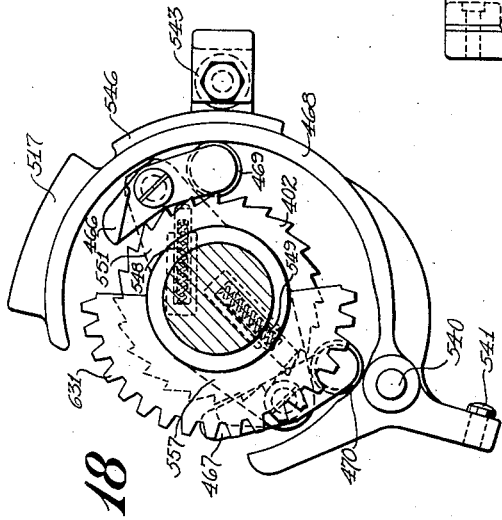
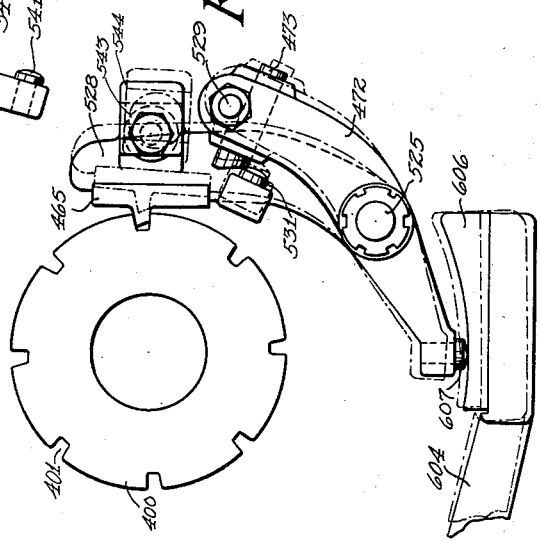
INVENTORS
O.F.Bauer and W.R.Carpenter
BY
ATTORNEY

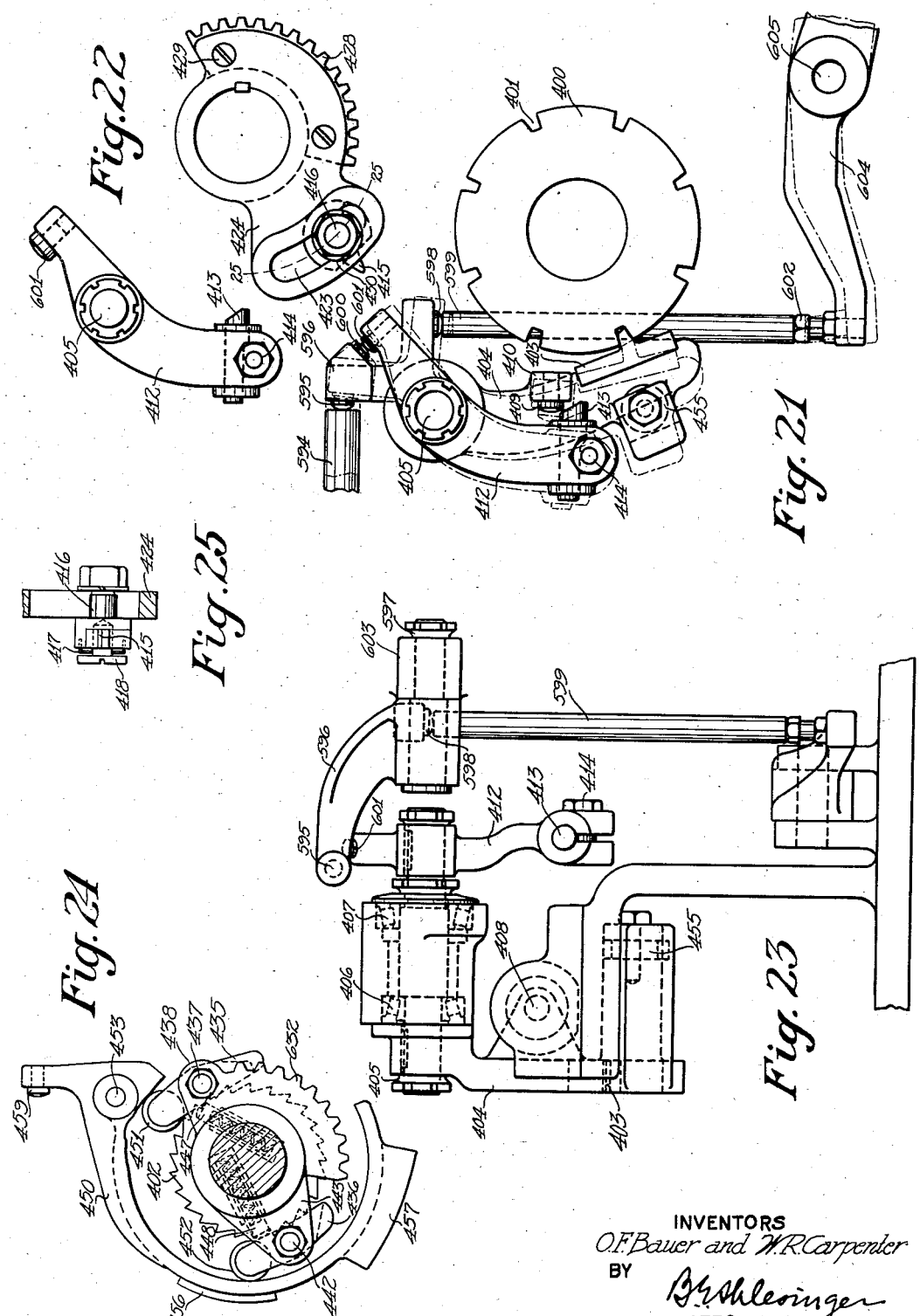

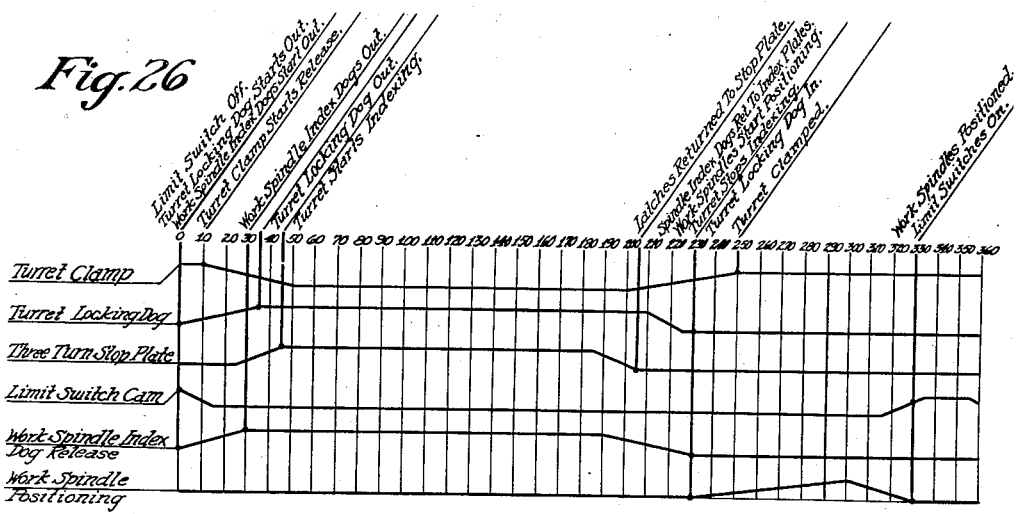
Fig. 26
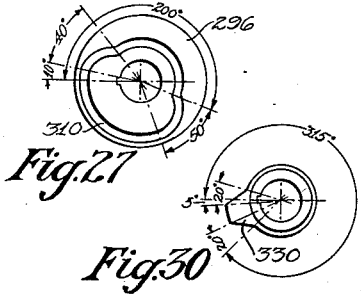
Fig. 27
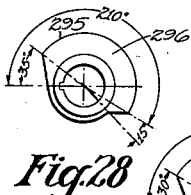
Fig. 28
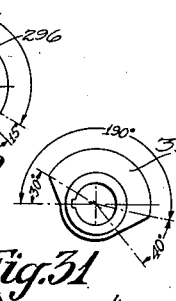
Fig. 29
Fig. 30
Fig. 31
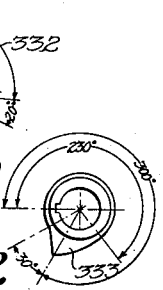
Fig. 32
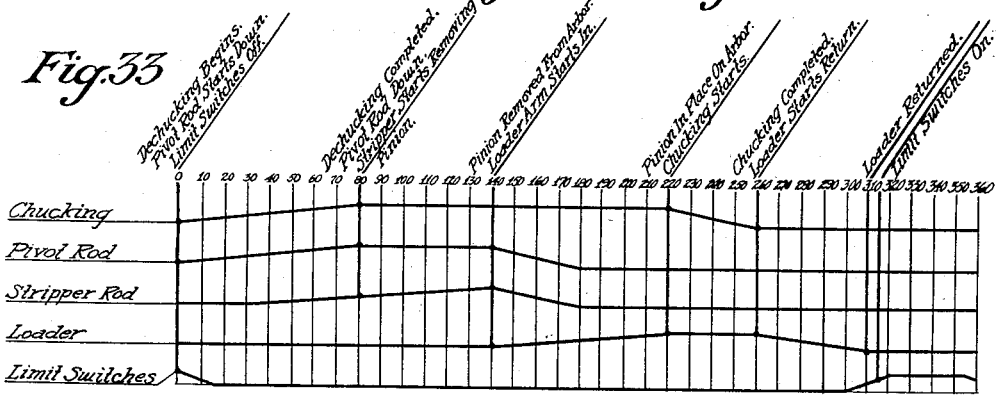
Fig. 33
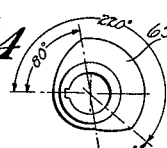
Fig. 34
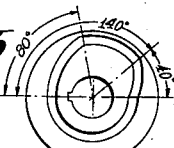
Fig. 35
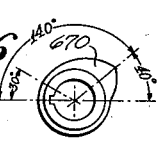
Fig. 36
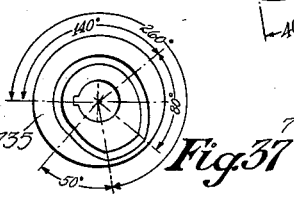
Fig. 37
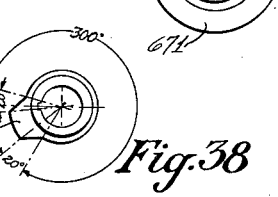
Fig. 38

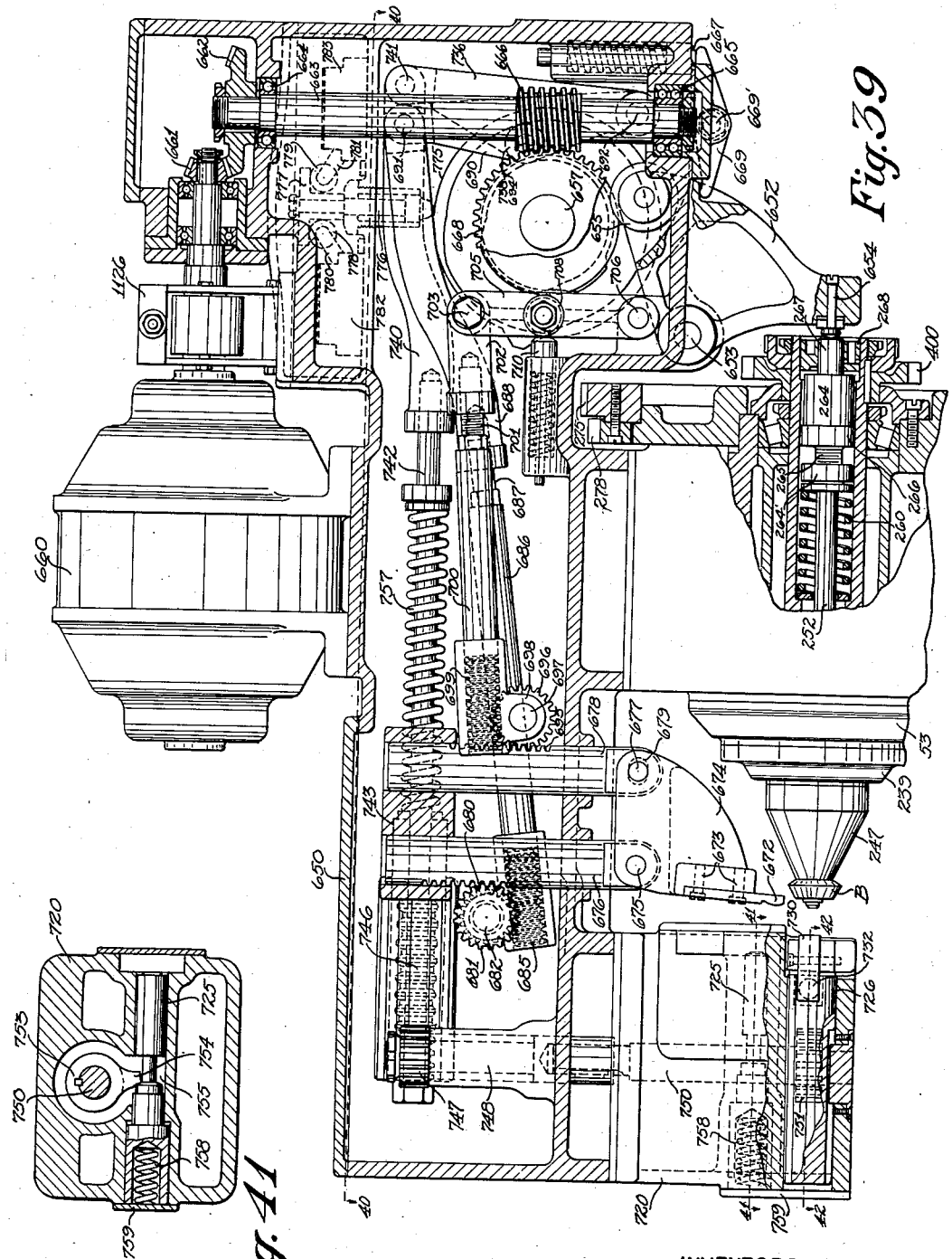

May 7, 1935.　　　O. F. BAUER ET AL　　　2,000,209
MACHINE FOR PRODUCING GEARS
Filed Aug. 9, 1932　　18 Sheets-Sheet 17
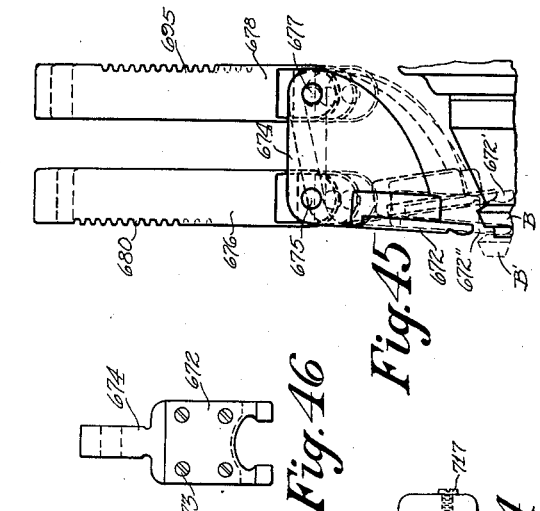
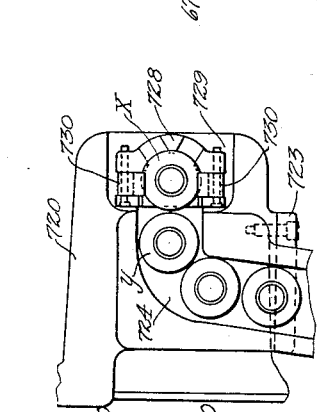
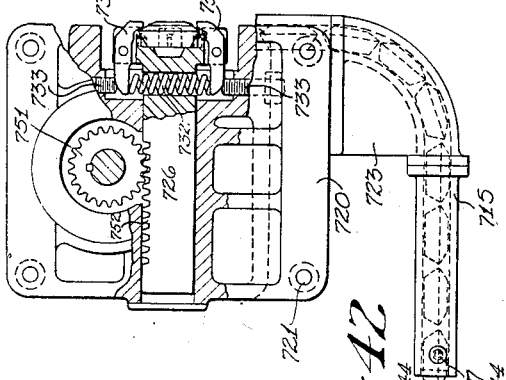
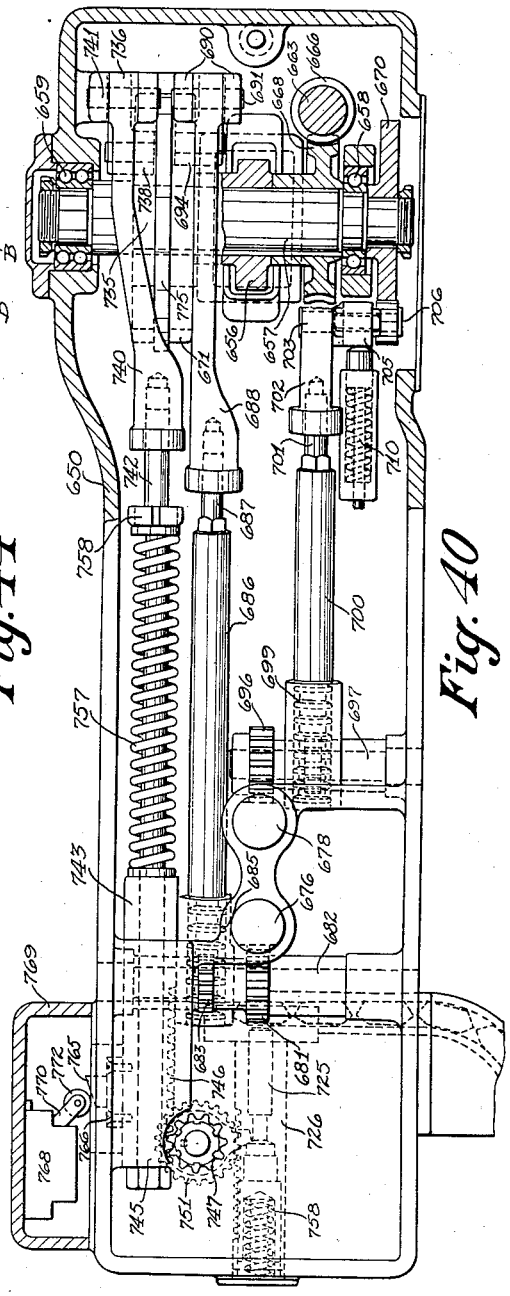
INVENTORS
O. F. Bauer and W. R. Carpenter
BY B. Schlesinger
ATTORNEY May 7, 1935.   O. F. BAUER ET AL   2,000,209
MACHINE FOR PRODUCING GEARS
Filed Aug. 9, 1932    18 Sheets-Sheet 18

INVENTORS
O.F.Bauer and W.R.Carpenter
BY
R.Schlesinger
ATTORNEY

Patented May 7, 1935

2,000,209

UNITED STATES PATENT OFFICE 2,000,209

MACHINE FOR PRODUCING GEARS

Oliver F. Bauer and William R. Carpenter, Rochester, N. Y., assignors to Gleason Works, Rochester, N. Y., a corporation of New York Application August 9, 1932, Serial No. 628,069

28 Claims. (Cl. 90—9)

The present invention relates to machines for producing gears and particularly to machines for producing bevel gears.

The primary object of the invention is to provide a machine for cutting gears on which a faster rate of production is possible than has been attainable with machines of previous designs. To this end, it is a purpose of the invention to provide a machine on which a gear blank may be first roughed out and then finish cut and in which the roughing and finishing operations on a blank are effected successively and automatically without the necessity for any manual handling of the blank or for adjustment of the machine between cuts.

A further object of the invention is to provide a machine having separate tool mechanisms for roughing and finishing blanks to the end that the tooth slots may be roughed out at high speed by one tool mechanism and the sides of the teeth then finish-cut by the other tool mechanism to obtain the required smoothness of tooth surface finish, and on which the roughing and finishing operations can be carried on simultaneously so that a plurality of blanks can be operated on simultaneously and the machine used most efficiently and economically.

The present invention relates particularly to machines of the station-type. The roughing and finishing tools might be mounted on a rotary turret and brought successively into engagement with the blanks to be cut, but the preferred construction is, as illustrated in the drawings, to mount a plurality of work spindles on the turret and index this turret periodically to bring the blanks mounted on said spindles successively into engagement with the roughing and finishing tools.

It is an object of the invention to provide a machine which will take a solid blank and deliver that blank at the end of the operation of the machine as a completed gear. In its preferred aspect, therefore, the invention contemplates provision of a machine on which the gear blank will be chucked and de-chucked automatically and on which the rotation of the turret and the operations of roughing and finishing will be automatically effected and controlled. The invention contemplates, also, provision of means for producing a relative generating rolling movement between the cutting tools and blank at least at the finishing station so that a completely generated gear can be produced. It will be understood, however, that it is within the contemplation of the invention to provide means for producing a partial or complete generating roll at the roughing station also, if the same is required or is desirable. It will be further understood that where the gears to be cut are of the formed or non-generated type, no generating roll is required at either station and the generating mechanism may be locked against operation or omitted entirely.

One of the features of the embodiment of the invention illustrated is the provision of means whereby the blanks, which are being roughed and finish cut, may be indexed simultaneously and from a single source and a still further feature is the provision of means whereby the two indexing mechanisms at the roughing and finishing stations may be operated from the generating roll.

A still further object of the invention is to provide means for interlocking the tool feed mechanisms and the turret drive so that the machine cannot be damaged by occurrence of a feed movement while the turret is being indexed or by occurrence of an indexing movement of the turret while tooth slots or teeth are being cut in the blanks.

The principal objects of the invention have already been described but the invention also includes a number of other meritorious features of machine design and operation as will appear hereinafter from the description and from the recital of the appended claims.

In the drawings:

Figure 1 is a front elevation of a combined roughing and finishing machine for straight bevel gears built according to a preferred embodiment of this invention, parts of the oil pan and loading mechanism of the machine being broken away for clearness of illustration;

Figure 2 is a plan view of the machine, parts of the loading mechanism again being broken away;

Figure 4 is a fragmentary view of the roughing unit showing parts of the drive to the roughing tool in section, the section being taken on the line 4—4 of Figure 2, but the view being on the same scale as that of Figure 3;

Figure 9 is a fragmentary front elevation of the machine with parts broken away, showing the blank carrying turret and a portion of the drive for the same, the view being on an enlarged scale as compared with Figure 1;

Figure 10 is a detail view showing the turret locking dog and the parts for operating the same;

Figure 12 is a section on the line 12—12 of Figure 11 looking in the direction of the arrows;

Figure 13 is a fragmentary rear elevation of the machine, the scale being slightly larger than that of Figure 1 but smaller than that of the detail views mentioned;

Figure 14 is a plan sectional view of the turret index mechanism and of the mechanism for effecting lock-up of the turret after indexing, the view being on a considerably larger scale as compared with Figure 9;

Figure 15 is a section on the line 15—15 of Figure 14, looking in the direction of the arrows and showing a detail of the turret indexing mechanism;

Figure 16 is a sectional view on an enlarged scale, showing details of construction of one of the chucks, the chuck being shown in released position whereas in Figure 11 it is shown in operative position;

Figure 11:
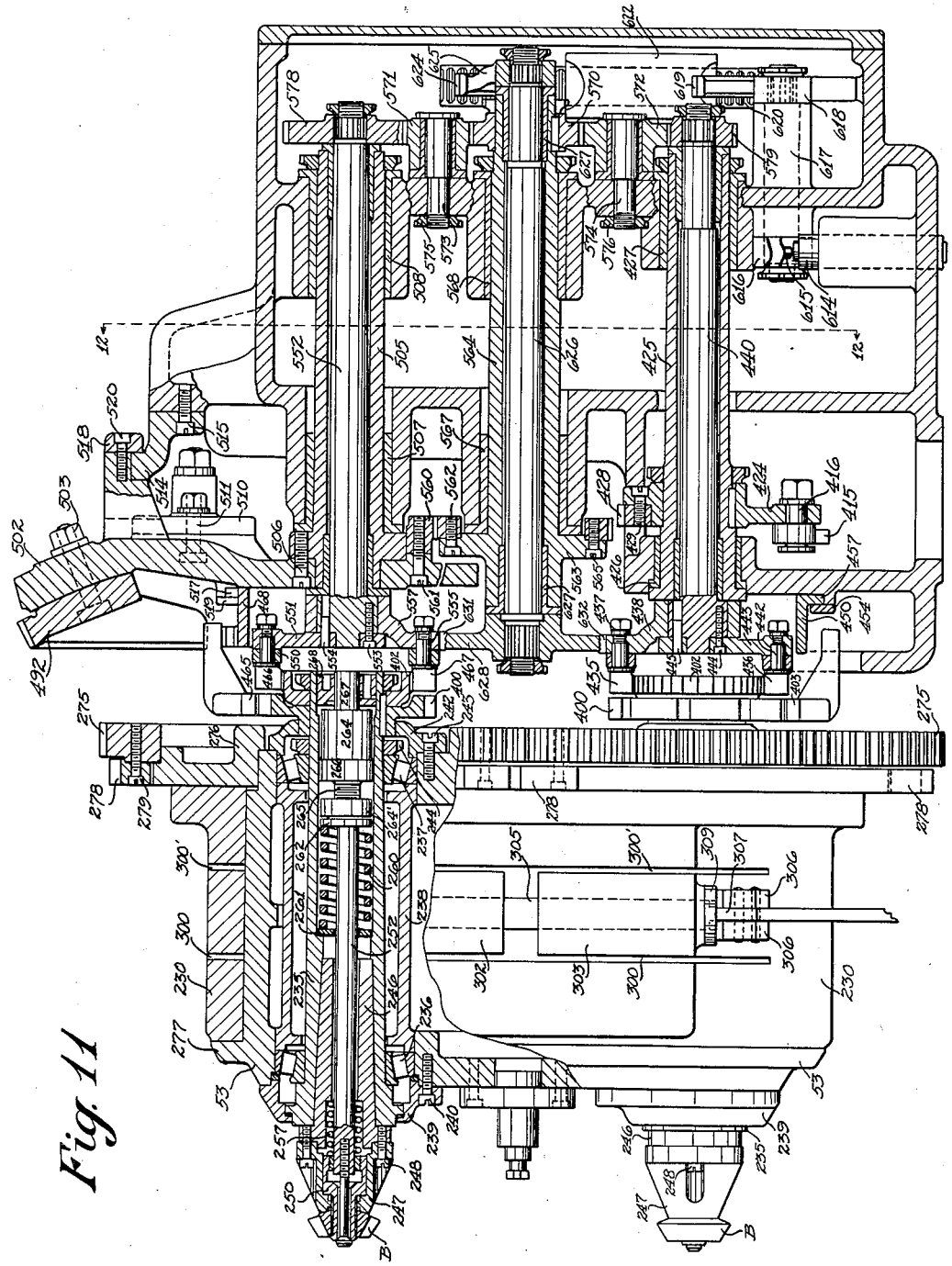
Figure 11 is a plan view of the turret and work-spindle index box, parts being broken away to show one of the work spindles and chucks and the indexing mechanism for the work spindles, the scale of the view being slightly larger than that of Figure 9.

Figures 17 to 20 inclusive are enlarged detailed views showing portions of the mechanism for indexing the work when at the finishing station, Figure 17 showing an index plate and the locking and trip dogs and a portion of the trip lever, Figure 18 showing a ratchet wheel, the two pawls which cooperate with the same and the cam which controls the movement of these pawls, Figure 19 showing the trip dog, the adjustable stop which operates the same, and a portion of the trip lever, and Figure 20 being a view at right angles to Figures 17, 18 and 19, showing the positions of the various parts when assembled;

Figures 21 to 25 inclusive are details of the index mechanism operating at the roughing station, Figure 21 showing one of the index plates, the index locking and trip dogs and parts of the trip lever which operates the trip-dog at the finishing station, Figure 22 showing the trip-dog and the adjustable stop for operating the same, Figure 23 being taken at right angles to Figures 21 and 22, showing the parts assembled, Figure 24 showing the ratchet wheel, the two pawls which cooperate with the same and the cam which controls the movement of these pawls, and Figure 25 being a section of the line 25—25 of Figure 22;

Figure 26 is a lay-out illustrating diagrammatically the sequence of operation of the parts driven thereby during the time of operation of the turret drive motor;

Figures 27–32 inclusive are detail views of the several cams which are operated by the turret drive motor;

Figure 33 is a lay-out illustrating diagrammatically the sequence of operation of the parts driven by the loading motor during the operation of that motor;

Figures 34 to 38 inclusive are detail views of the several cams which are operated by the loading motor;

Figure 39 is a view showing one of the work spindles at the loading station and showing the loading mechanism in inoperative position, parts being broken away and shown in section for the sake of clearness of illustration, the view being on substantially the same scale as that of Figure 11 and at right angles thereto;

Figure 40 is a section on the line 40—40 of Figure 39, looking in the direction of the arrows;

Figure 41 is a section on the line 41—41 of Figure 39;

Figure 42 is a part section, part plan view showing the blank magazine and the blank receiving and loading plunger;

Figure 43 is a fragmentary view taken at right angles to that of Figure 42 and looking at the magazine and loading bar;

Figure 44 is a section on the line 44—44 of Figure 42 but on an enlarged scale, showing how the blank magazine is shaped to prevent blanks from being wrongly inserted in the same;

Figure 45 is a fragmentary view taken in the same direction as Figure 39 and illustrating the oscillation of the stripping mechanism;

Figure 46 is a detailed view showing the stripper; and

Figure 47:
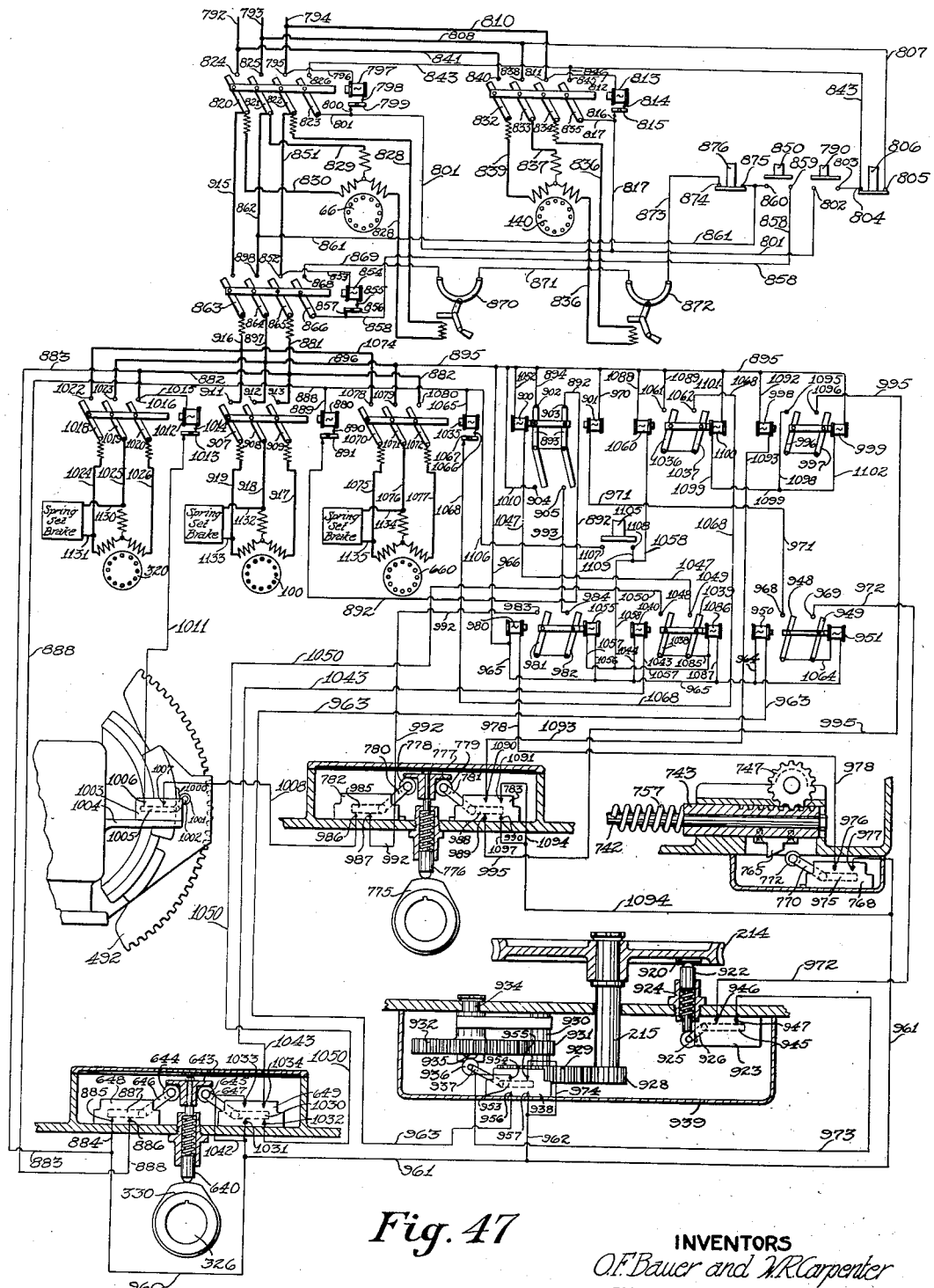

Figure 47 is a diagrammatic view showing how the machine may be wired electrically to perform its functions.

In the illustrated embodiment of the invention, the machine is provided with four work spindles mounted upon a rotary turret and spaced 90° apart. Blanks are placed on the work spindles by the automatic loading mechanism during the time each spindle is at the loading station. The turret is indexed periodically, being rotated each time through a quarter of a turn. The indexing of the turret carries a blank first to the roughing station, then to an intermediate idle station, then to a finishing station, and finally back to the loading station again where the completed gear is removed and a new blank chucked.

The roughing cutter is mounted at one side of the machine; the reciprocating planing tools used for finishing at the other side.

In the roughing operation, the rotating milling cutter is alternately fed into the blank to cut a tooth space of the blank and then withdrawn to allow the blank to be indexed. During the roughing-feed movements, the blank is held stationary.

At the finishing station, the generating roll is produced by rotating the blank, which is being finished, on its axis and simultaneously rocking the reciprocating tools about an axis intersecting the blank axis. This latter motion is effected by oscillation of a cradle on which the tools are mounted. The finishing tools are fed into full depth engagement with the blank before the generating roll on each tooth begins and are withdrawn from engagement with the blank after each tooth is generated so as to permit the blank to be indexed.

The index mechanisms for the work spindles are of the notched plate type and indexing at both cutting stations is done through ratchet and pawl mechanisms operated by the generating roll at the finishing station. There are a notched plate and ratchet wheel secured to each work spindle. The remainder of the two index mechanisms are mounted at the two cutting stations, on relatively fixed parts of the machine. Just prior to each index of the turret, the index plates are unlocked so that the index parts carried by the pair of work spindles then at the two cutting stations can clear the relatively stationary index parts as the turret is rotated and the notched plates and ratchet wheels of the other pair of spindles can move into proper position. The work spindles are free to rotate during the time they are at the idle and the loading stations. Means is provided, therefore, for slightly rotating each pair of work spindles after arrival at the cutting positions, that is, after each index of the turret, so as to bring index plates and ratchet-wheels carried thereby into proper position for engagement by the relatively stationary parts of the index mechanisms.

The stripping of the completed gears, loading of new blanks, and chucking of the same at the loading station occur while the turret is stationary and while cutting is going on at the two cutting stations. The indexing mechanisms for the roughing and finishing tools are interlocked electrically so that index of the turret cannot occur while the tools are cutting or vice versa, the tools cannot cut while the turret is being indexed. A safety device is also provided to prevent indexing of the turret unless the chucking operation has been performed properly on the work spindle at the loading station and the new blank properly positioned thereon.

Referring to the drawings by numerals of reference, 50 designates the base or frame of the machine, 51 the roughing unit, 52 the finishing unit, and 53 the indexable turret on which the work spindles are mounted.

Roughing cutter, its mounting and drive

The roughing is done by a milling cutter C which may be of any usual or suitable type. The blades of this cutter may be made integral with the cutter head, or the cutter may be of the inserted blade type. The cutter may have straight cutting edges or the cutting edges may be shaped to approximate the profile curvature of the teeth of the gear to be cut. In the drawings (Figure 4), the cutter shown is of the inserted blade type and the blades 55 are secured to the cuttter head 56 by the clamping-ring 57 and the bolts 58.

Figure 3:
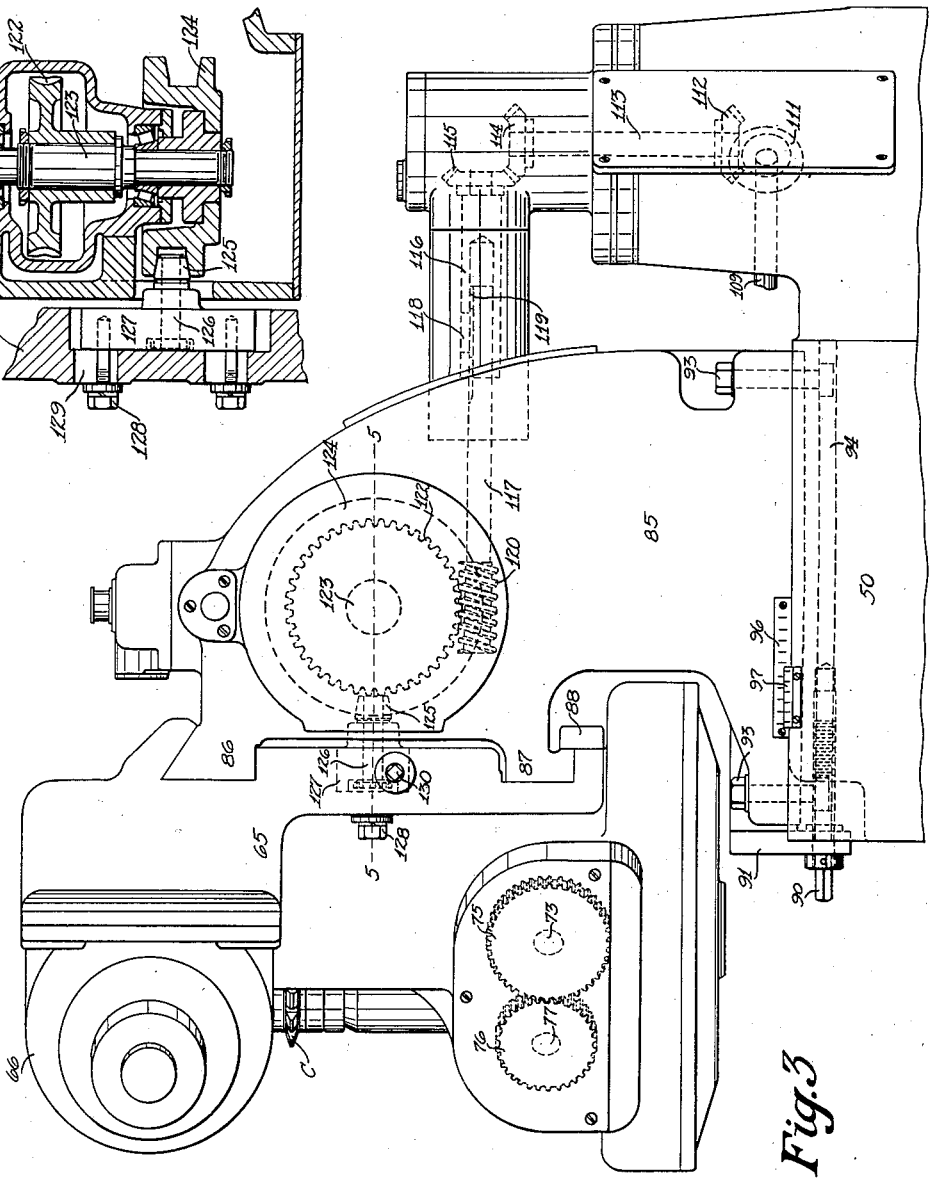
Figure 3 is a fragmentary view on an enlarged scale, looking at the roughing unit of the machine from one side thereof.

The cutter head 56 is secured to the vertical spindle 60 by the clamping disc 61 and bolt 62. The cutter spindle 60 is journaled on anti-friction bearings 63, in a slide 65. The spindle 60 is rotated from the motor 66 to impart the cutting movement to the cutter (Figs. 3 and 4).

The motor 66 is mounted on the slide 65. It drives the bevel pinion 67 which is secured to a shaft 68 that is coupled to the armature shaft of the motor. The pinion 67 drives a bevel gear 69 which is keyed to a vertical shaft 70. The shaft 70 is journaled in anti-friction bearings in the slide 65 and carries at its lower end a bevel pinion 71. The pinion 71 meshes with a bevel gear 72 which is secured to a short shaft 73 (Fig. 3). There is a spur gear 75 fastened to the outer end of the shaft 73 and this spur gear meshes with another spur gear 76 which is secured to a shaft 77. The shaft 77 is journaled in anti-friction bearings in the slide 65 and there is a bevel pinion 78 secured to the inner end of this shaft. The pinion 78 meshes with a bevel gear 79 which is bolted to a fly-wheel 80 that is keyed to the cutter spindle 60. The gears 75 and 76 form a set of change gears governing the speed of rotation of the cutter C and for different speeds of rotation, other change gears may be used.

The slide 65 is slidably adjustable and movable on a column 85 and is formed for this purpose with ways that engage the guide-rails 86 and 87 which are formed integral with the column. The upper of the ways of the slide 65 is shaped to engage around the rail 86 while a strap or gib 88 cooperates with the lower way of the slide 65 and with the rail 87 to hold the slide 65 on the column 85. The means for adjusting and for reciprocating the slide 65 on the column 85 will be described later.

The column 85 is mounted on the base 50 for adjustment thereon in a direction perpendicular to the direction of adjustment of the slide 65 on the column 85. The column is adjusted on the base by rotation of the shaft 90 which is journaled in a plate 91 that is secured by screws 92 to the column 85. The screw shaft threads into a nut (not shown) which is secured to the base 50. The column is secured in any adjusted position on the base by T-bolts 93 whose heads engage in the longitudinal T-slots 94 that are formed in the base. A scale 96 and vernier 97 may be provided as shown in Figure 3 to permit accurate adjustment of the column 85 on the base of the machine.

Roughing feed mechanism

The slide 65 is reciprocated on the column 85 to impart an alternate movement of feed and withdrawal to the cutter C, whereby the cutter may cut tooth spaces in a gear blank on the feed movements and may be clear of the blank during the periods of withdrawal to permit indexing of the blank.

The slide 65 is actuated from the motor 100 (Figs. 2 and 13). This motor is suitably mounted upon the base 50 of the machine. It drives the bevel pinion 101 which is coupled to the armature shaft of the motor. The pinion 101 meshes with the bevel gear 102 which is keyed to a shaft 103. There is a spur gear 104 secured to the shaft 103 and this meshes with a spur gear 105 that is fastened to a shaft 106. There is a bevel pinion 107 secured to the shaft 106. This meshes with a bevel gear 108 which is fastened to a shaft 109. There is a bevel gear 111 secured to the opposite end of the shaft 109. This gear meshes with a bevel gear 112 (Figs. 3 and 13) which is secured to a vertical shaft 113. There is a bevel gear 114 fastened to the upper end of this vertical shaft. It meshes with a bevel gear 115 which is secured to a sleeve 116.

The sleeve 116 has telescoping engagement with a shaft 117 and the sleeve 116 and shaft 117 are connected against relative rotation by a key 118 which is secured to the sleeve 116 and which engages in a longitudinal slot 119 formed in the shaft 117.

Figure 5:
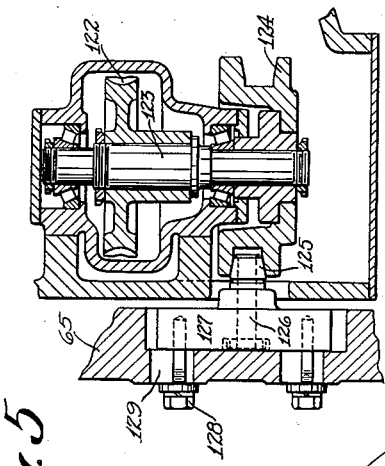
Figure 5 is a section on the line 5—5 of Figure 3.

There is a worm 120 secured to the shaft 117. This worm meshes with a worm wheel 122 (Figs. 3 and 5) which is keyed to a shaft 123 that is journaled in the column 85. There is a cam 124 keyed to the shaft 123. The roller 125 engages in the track-way of this cam. This roller is mounted upon a stud 126 which is secured in a plate 127.

The plate 127 fits into a slot or groove formed in the back of the slide 65 and it is adjustably secured to the slide 65 by means of bolts 128. These bolts pass through elongated slots 129 in the slide 65 and thread into the plate 127. When the bolts 128 are loosened, the slide 65 can be adjusted relative to the plate 127 and the column 85 by rotation of the screw shaft 130 which threads into the plate 127. When the slide 65 and plate 127 are secured together by the bolts 128, the rotating cam 124 will impart a reciprocating motion to the slide 65 to produce the alternate movements of feed and withdrawal of the cutter C to which reference has already been made.

*Finishing tools, their mounting and their drive*

The blanks are finish cut by a pair of reciprocating planing tools designated at T and T', respectively, in Figures 1, 2, 6 and 8.

These finishing tools T and T' are mounted upon a pair of reciprocating tool slides 135 and 136, which reciprocate in guides formed in the tool arms 137 and 138. The tool arms 137 and 138 are mounted on the tool head 139 and are adjustable angularly thereon about a common center so that the tools may be adjusted to cut in converging paths in accordance with the lengthwise taper of the teeth of the bevel gears to be cut. The tool arms are secured in position on the tool head 139, after adjustment, by bolts 162 which pass through arcuate slots 163 formed in the tool arms and thread into the face of the tool head.

Figure 7:
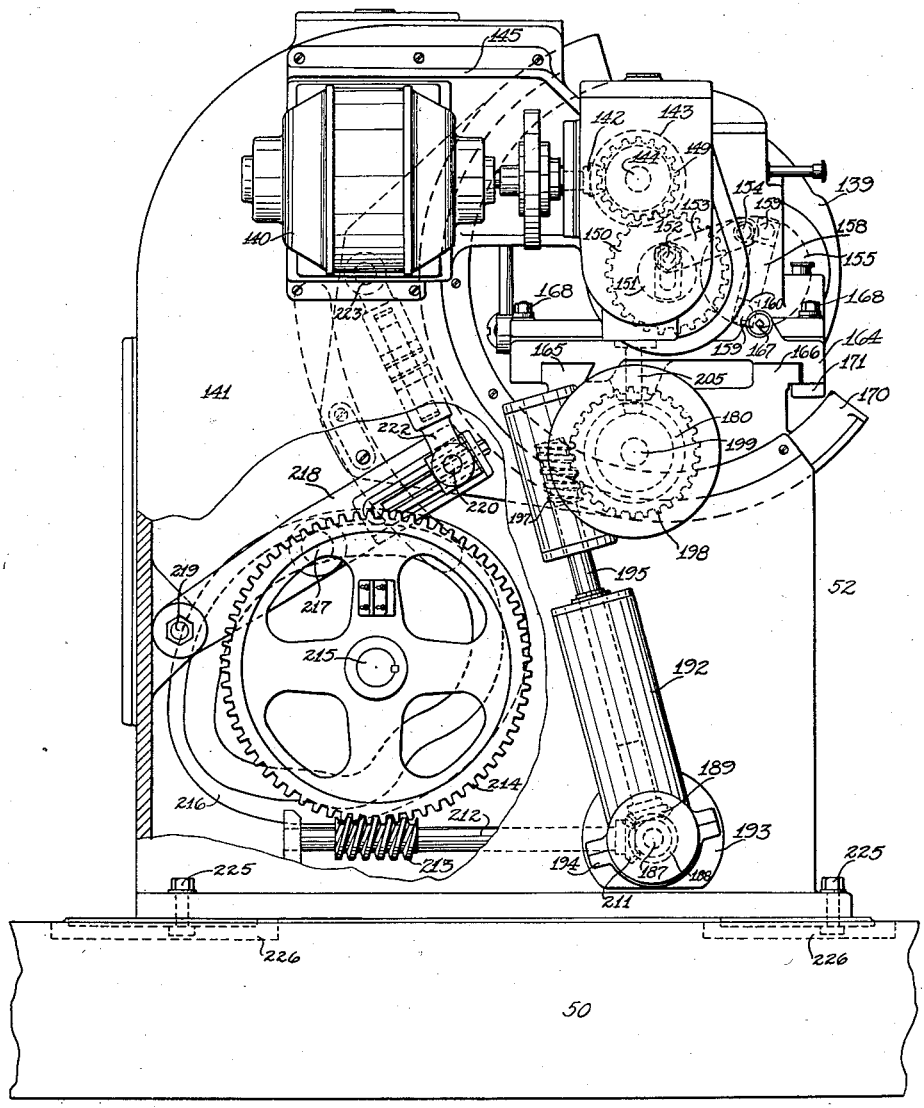
Figure 7 is a view of the finish cutting unit taken on the same scale as Figure 6 but looking at the opposite side of the unit, the view being from the opposite side of the machine from the view of Figure 3.
Figure 8:
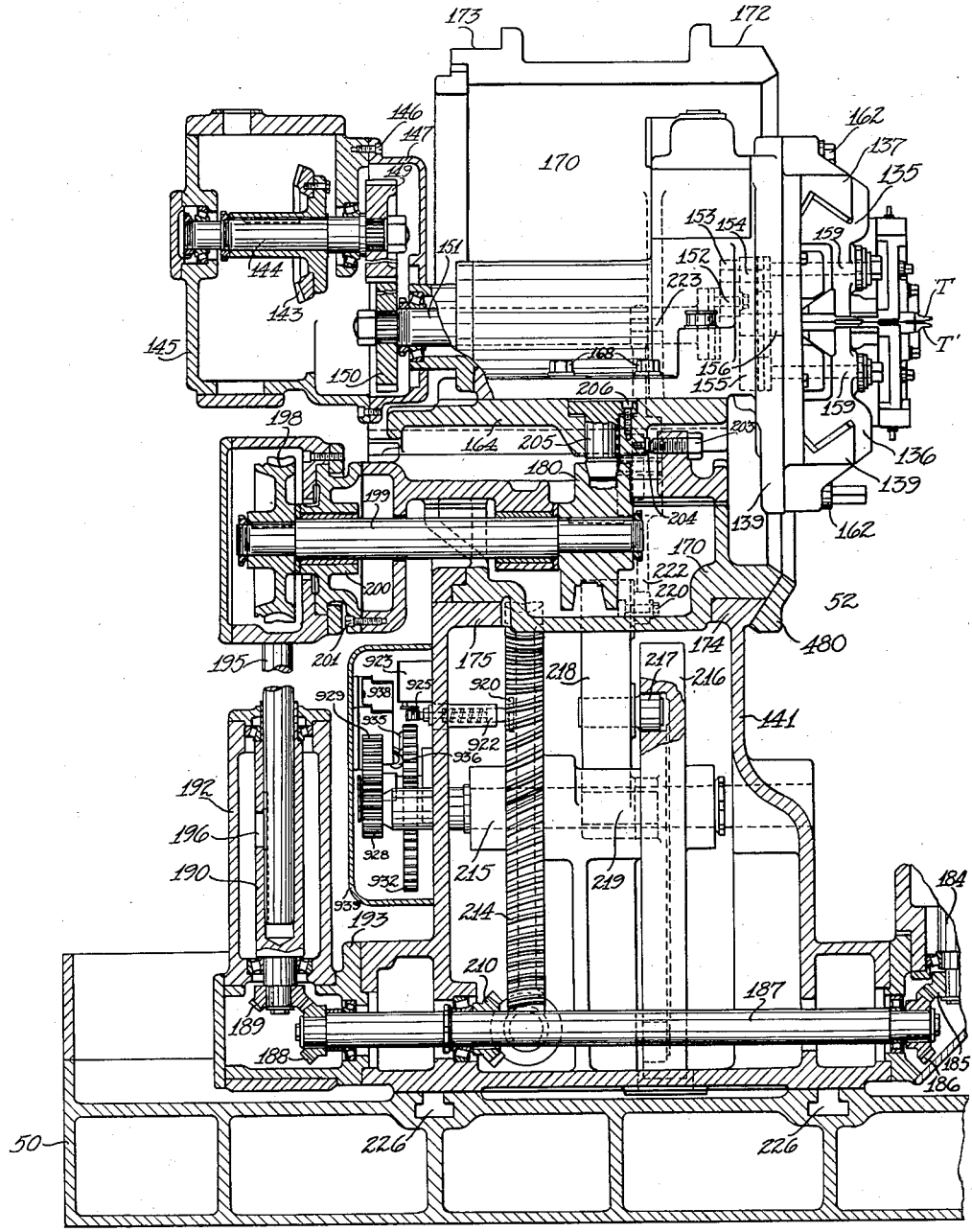
Figure 8 is a view at right angles to the views of Figures 6 and 7 and looking at the finishing unit from the front of the machine, parts being broken away to show the drive mechanism and the scale being slightly larger than that of Figures 6 and 7.

The tool slides 135 and 136 are actuated from the motor 140 (Fig. 7) which is mounted on a bracket 145 that is secured to a column 141 that is adjustable on the base 50 of the machine. The motor 140 drives the bevel pinion 142 which is connected to the armature shaft of the motor. This pinion meshes with a bevel gear 143 that is keyed to a shaft 144. The shaft 144 is journaled on anti-friction bearings in the bracket 145 (Fig. 8). There is a change gear guard 147 fastened by screws 146 to the bracket or plate 145.

Figure 6:
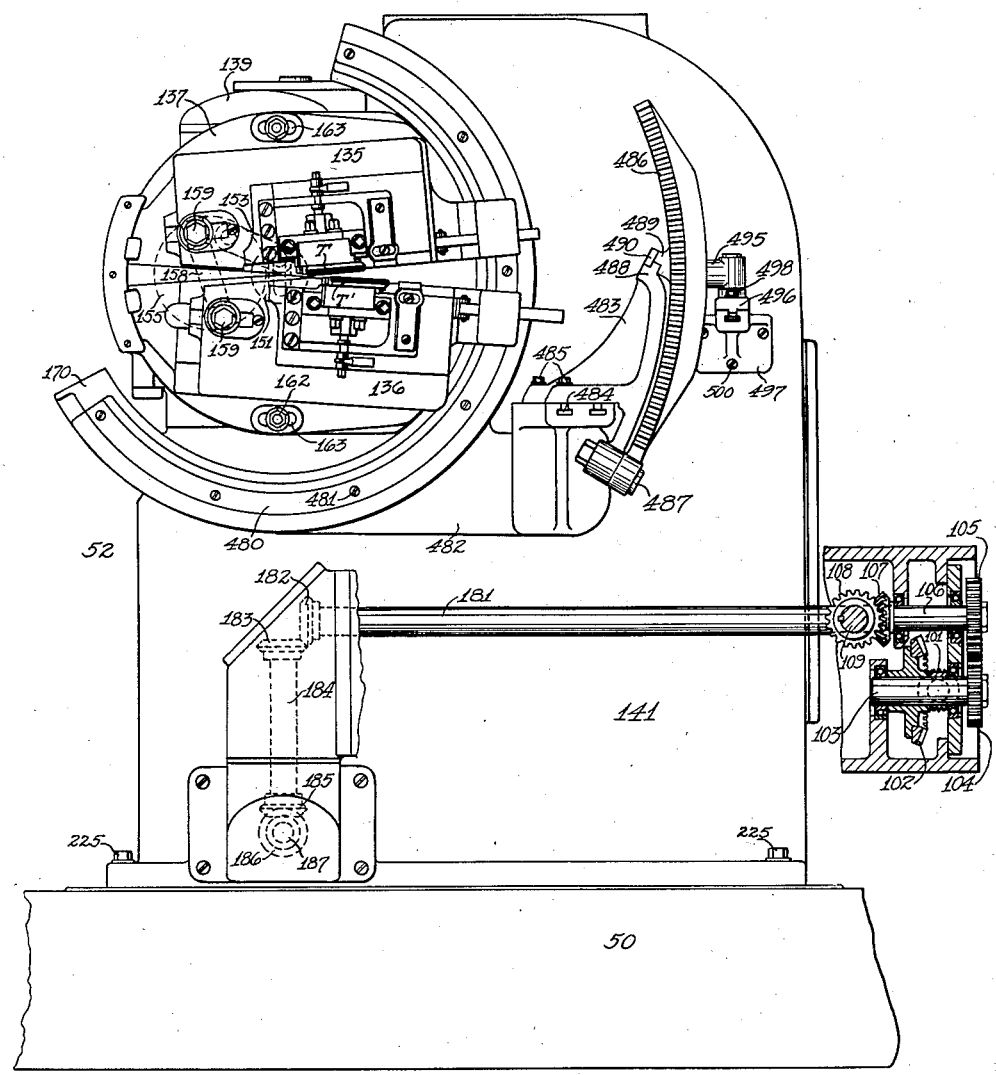
Figure 6 is a view of the finish cutting portion of the machine showing the finishing tool mechanism in elevation, the view being on the same scale as Figures 3 and 4.

There is a spur gear 149 fastened to the shaft 144. This meshes with a spur gear 150 which is fastened to shaft 151. The shaft 151 is journaled on anti-friction bearings in the tool head 139. The inner end of the shaft 151 is enlarged and slotted to receive the crank pin 152 (Figures 6, 7 and 8).

The shaft 151 is connected by means of the crank pin 152, link 153 and pin 154 with an actuating plate 155. The actuating plate 155 is formed with an integral spindle 156 which is suitably journaled in the tool head 139. The forward face of this plate is provided with a slot 158 that extends diametrically across the same. The actuating plate is connected to the tool slides 135 and 136 by the bolts or pins 159 and the blocks 160 which slide in the slot 158.

The tools T and T' are themselves secured to tool posts which are mounted in clapper blocks that are movable alternately in opposite directions to move the tools alternately to and from cutting position. The tool posts, clapper blocks and their mounting and operating mechanism are the same as shown in the patent to James E. Gleason et al. No. 1,660,502 of February 28, 1928 and will not be described here in detail for the construction is well known in the art. It is sufficient to say that the mechanism is such that the tools cut alternately. The drive to the tool slides is also similar to that disclosed in the patent to James E. Gleason et al. above referred to.

The tool head 139 is adjustable on a carriage 164 to adjust the tools T and T' for cutting depth. This adjustment is effected by rotation of the screw 167 (Figs. 1, 2 and 7) which is mounted in the carriage 164 and threads into the head 139. The head is secured to the carriage, after adjustment, by bolts 168 which pass through slots 169 in the head 139 and thread into the carriage 164.

The carriage 164 is reciprocable to move the planing tools alternately to and from cutting position. The periodic withdrawal of the tools from engagement with the blank is to permit indexing the blank.

In its reciprocating movement, the carriage 164 slides on ways 165 and 166 (Fig. 7) formed on the upper face of an oscillating cradle 170. The head is held on the ways of the cradle by the gib or strap 171.

The cradle 170 is oscillatably mounted in the column 141 and is formed with guide surfaces 172 and 173 (Fig. 8) which engage and move back and forth on the arcuate guide rails 174 and 175, respectively, that are formed on the upright or column 141.

*Feed mechanism of finishing tools*

The carriage 164 is reciprocated by operation of the cam 180 (Figs. 7 and 8). This cam is driven from the shaft 106 (Figs. 6 and 13) from which the roughing-feed cam 124 is also driven as already described. This shaft 106 telescopes for the purpose of assembly into a shaft 181. The shaft 181 (Fig. 6) carries a bevel gear 182 which meshes with a bevel gear 183 that is secured to a vertical shaft 184. There is a bevel gear 185 secured to the lower end of the shaft 184 and this meshes with a bevel gear 186 which is secured to a shaft 187 that is journaled in the column 141. There is a bevel gear 188 (Fig. 8) secured to the inner end of the shaft 187. This meshes with a bevel gear 189 (Figs. 7 and 8) which is keyed to a hollow shaft 190. The shaft 190 is journaled on anti-friction bearings in the swinging arm 192 that is oscillatably mounted on a bearing-member 193 which is secured in any suitable manner to the column 141. The sleeve 192 has a semi-cylindrical foot portion which bears on the bearing member 193 and the sleeve is held on the bearing member by a cap-piece 194 (Fig. 7) which is secured to the foot portion of the sleeve by screws (not shown).

There is a shaft 195 which telescopes into the hollow shaft 190 and which is held against angular movement relative to the shaft 190 by the key 196. This key is secured in the shaft 190 and engages in a longitudinal slot formed in the shaft 195.

A worm 197 is secured to the upper end of the shaft 195. This worm meshes with a worm wheel 198 which is keyed to the cam shaft 199. The cam shaft is journaled in the cradle 170 and in a bracket 200 which is secured by screws 201 to the cradle. The cam 180 is keyed to the cam shaft 199.

The roller 205 which is secured to the carriage 164 by screws 206, engages in the track of the cam 180 and as the cam rotates a reciprocating movement is imparted to the tool head to alternately feed the planing tools into the blank and withdraw them from engagement therewith.

A screw 203 (Fig. 8) which threads into the cradle acts as a positive stop for the feed movement. This screw is adapted to abut against a hardened stud 204 that is threaded into the carriage 164.

Mechanism for producing generating roll of cradle

In order to be able to produce a generated gear on the machine, provision is made for imparting a generating roll between the cutting tools and the gear blank at the finishing station. To this end, means is provided for rocking the cradle 170 on its axis and for simultaneously oscillating each blank about its axis during the time it is at the finishing station. The means for oscillating the cradle will be described now and the means for oscillating the blanks at the finishing station will be described later.

Keyed to the shaft 187 (Fig. 8) intermediate the ends of this shaft is a bevel gear 210 which meshes with a bevel gear 211 that is secured to a transverse shaft 212 (Fig. 7). There is a worm 213 integral with the shaft 212 and this worm meshes with a worm wheel 214. The worm wheel 214 (Figs. 7 and 8) is keyed to a shaft 215 that is journaled in the column 141. There is a cam 216 also keyed to the shaft 215.

A roller 217 engages in the track of this cam 216. This roller is mounted in a lever arm 218. This lever arm is pivotally mounted at one end on the column 141, being secured thereto by the pivot pin 219. The lever 218 is slotted adjacent its other end to receive the T-bolt 220 which connects the lever pivotally with the lower end of a turn-buckle 222. The upper end of the turn-buckle is pivotally connected by means of the pin 223 with the cradle 170. Thus, as the cam 216 rotates, an oscillating motion is imparted to the cradle 170. The finishing tools have, therefore, a reciprocating cutting motion, an alternate movement of feed and withdrawal and an oscillatory generating motion.

The column 141 is mounted on the base 50 for angular adjustment thereon about the apex center of the generating unit so that the paths of the cutting tools T and T' may be adjusted in accordance with the pitch cone angle of the gear to be cut. The column is secured in any adjusted position on the base by T-bolts 225 whose heads engage in arcuate T-slots 226 (Figs. 1, 2, 7 and 8) formed in the base 50.

Mountings of work spindles in the turret

The gears to be cut are secured on work spindles mounted in the turret 53. As shown clearly in Figs. 1 and 2 of the drawings, the turret is mounted between the roughing and finishing units of the machine. The turret is cylindrical in shape and is journaled in a cylindrical bearing 230 (Fig. 11) which is formed integral with the base 50 of the machine.

There are four work spindles journaled in the turret 53. As these spindles are identical in construction only one need be described in detail. One is shown in section in Figure 11. The work spindle proper is designated at 235. It is journaled in anti-friction bearings 236 and 237 in the turret. The outer races of these bearings are held in spaced relation by a spacer sleeve 238 while the races of the forward bearing 236 are held against axial movement by the spindle 235 and by the member 239 which is secured to the face of the turret 53 by screws 240 and which cooperates with the spindle to form a labyrinth seal preventing entrance of dirt or grit into the bearing. The outer race of rear bearing 237 is held in position by the cap-member 242 which is secured to the turret by screws 243 and the inner race of this rear bearing is held in position by the nut 244 which threads onto the spindle 235.

Each work spindle 235 is formed with a taper bore to receive an arbor 246. The gear blank to be cut is secured against a nose 247 that is fastened to the arbor 246 by screws 248. The face of the nose 247 is suitably shaped to provide a support against which the back of the gear blank may seat.

Chucks

The blank to be cut is chucked against the nose 247 of each work spindle by an expansible collet 250 which, as shown clearly in the enlarged view of Figure 16, is provided with a plurality of resilient gripping fingers 251 formed by slotting the collet longitudinally.

The collet 250 is expanded to cause its fingers to grip the blank by rearward movement of the draw-bar 252. This draw-bar slides in the bore of the arbor 246 and in the bore of the work spindle 235. There is a rod 253 threaded into the forward end of the draw-bar and this rod is formed with an enlarged head 254 that is adapted, on rearward movement of the draw-bar, to engage the fingers 251 of the collet 250 and expand the same to grip the gear blank and hold it firmly against its seat on the nose 247.

The collet is mounted to be slidable relative to the draw-bar, having threaded engagement with a guide-nut 255 that surrounds and is slidable on the draw-bar 252. The collet is normally pressed forward, that is, toward released position by a coil spring 257 which is interposed between the nut 255 and a shoulder formed in the bore of the arbor 246. The purpose of making the collet movable relative to the draw-bar is to insure that the rod 253 will move rearwardly far enough relative to the collet so that when the head 254 of this rod engages the gripping fingers 251 of the collet, it will exert sufficient of an expanding movement on these fingers to hold the gear blank rigidly against movement. The spring 257 has the added function of assisting in the release of the collet when it is desired to de-chuck the completed gear.

The draw-bar is constantly urged rearwardly in the spindle 235 by operation of the coil spring 260, thereby constantly tending to force the rod 253 into collet-expanding position. This spring is interposed between a washer 261, that seats against the shoulder in the bore of the work spindle, and the head 262 of the draw-bar. The chucking mechanism of a spindle is released by forcing the draw-bar 252 forward against the resistance of the coil-spring 260. To release the chucking mechanism, there is a slidable member or piston 264 mounted in the bore of the work spindle 235. This member is made in two parts adjustable with reference to one another, one part, designated at 264' being threaded on a stem 265 which is integral with the other part. The piston 264 is guided in the bore of the work spindle by an enlarged guide surface 266 (Figs. 11 and 39) and by a stem portion 267 which slides in a guide-member 268 that has a pressed fit in the bore of the work spindle. In the preferred construction of the machine, mechanism is provided for automatically releasing the chuck, as will be described later, but the chucking mechanism might be arranged so as to be manually released also.

Turret indexing and clamping mechanisms

In operation, as already described, a blank is placed on each of the work spindles of the machine as each is indexed into the upper position shown in Figure 9 by rotation of the turret 53. The turret rotates in a clockwise direction and each time that the turret is indexed it is rotated through a quarter of a revolution. On the first indexing movement of the turret after a blank has been chucked, the blank is brought to the roughing station. There the roughing cycle takes place and the tooth spaces of the blank are roughed out by the roughing cutter C. On the next indexing movement of the turret, the blank is advanced to an idle station at the bottom of the turret. On the next indexing movement of the turret, the blank is advanced to the finishing station where its teeth are finish cut by the planing tools T and T'. On the next indexing movement of the turret, the blank, which is now a completed gear, is brought back to the loading station and the completed gear is removed and a new blank chucked in its place. Each time that a work spindle arrives at the loading station, a completed gear can be removed from the machine and a new blank chucked in its place. The mechanism for indexing the turret and for locking the turret in any indexed position will now be described.

275 designates a large spur gear. This gear is secured by screws (not shown) to a ring 276 (Figs. 9, 11 and 14). The ring 276 is secured by screws (not shown) to the turret 53. The ring 276 cooperates with a flange 277 formed on the forward end of the turret to hold the turret against axial movement in its bearing 230.

There are four identical lock-up plates 278 secured to the spur gear 275 at intervals of 90° apart. The screws 279 serve to secure these lock-up plates 278 to the spur gear 275. Each of these lock-up plates 278 is formed with a notch 280 adapted to receive the lock-up dog 282.

This lock-up dog 282 (Figs. 9 and 10) is mounted on an arm 284 which is pivotally mounted at 285 on the frame of the machine. The dog is constantly urged into locking position by the spring-pressed plunger 286 which is housed in a cylinder secured to the frame of the machine and which is normally pressed outwardly of this cylinder by the coil spring 287. The turret is located in its several indexed positions by engagement of the lock-up dog 282 successively in the notches 280 of the plates 278. The locking-dog is withdrawn from engaged position, to permit rotation of the turret, by operation of the lever 288. This lever is formed with a catch 289 (Fig. 10) which engages over a ledge 290 formed on the arm 284. The lever 288 is keyed to a pin 292 (Figs. 9, 10 and 14) that is journaled in the frame of the machine. There is an arm 293 also keyed to the pin 292. This arm carries a roller 294 which engages the external cam surface 295 of a double-track cam 296. As the cam 296 rotates in the cycle of operation of the machine, the arm 293 is rocked, rocking the pin 292 and lever 288 and causing the lock-up dog 282 to be moved into or withdrawn from engaging position.

While the lock-up dog 282 has been referred to as the means for holding the turret against movement in any indexed position, its primary purpose is really to locate the turret accurately in its indexed position. An auxiliary means is provided for rigidly clamping the turret against rotation after each indexing movement.

The bearing 230 for the turret is slit as indicated at 300 and 300' (Figs. 9 and 11) to provide two resilient clamping tongues 302 and 303. The adjacent parts of these two tongues are of enlarged size to provide lugs in which there slides a rod 305.

One end of this rod is provided with an enlarged head as indicated at 306. The other end of the rod is formed with a pair of ears 306 between which there is pivotally mounted a lever 307. This lever is formed with a cam surface 308 that is adapted to cooperate with a hardened piece 309 secured to the tongue 303. When the lever 307 is rocked in one direction, the tongues 302 and 303 are drawn together by the rod 305 to clamp the periphery of the turret 53, while when the lever 307 is moved in the opposite direction, the turret is released.

The lever 307 is operated from the rotary cam 296 (Figs. 9 and 14). This cam has an internal cam path 310 in addition to the external cam-track 295. There is a roller 311 which operates in the track 310. This roller is carried by an arm 312 which is keyed to a pin 313 that is journaled in the frame of the machine. There is an arm 314 also keyed to the pin 313. A link 315 pivotally connects the arm 314 with the lever 307.

The cam 296 is driven from the motor 320 which is suitably mounted upon the frame of the machine. This motor drives the bevel pinion 321 which is connected to the armature shaft of the motor. The pinion 321 meshes with a bevel gear 322 which is secured to a shaft 323 that is suitably journaled in the frame of the machine. There is a worm 324 fastened to the shaft 323 and this worm meshes with a worm wheel 325 which is keyed to the shaft 326. This shaft 326 is journaled on anti-friction bearings 327, 328 and 329 in the frame of the machine. The cam 296 is keyed to this shaft 326.

Besides the cam 296, there are also cams 330, 331, 332 and 333 keyed to the shaft 326. The purposes of these several cams will be described later.

The mechanism for indexing the turret is driven from the shaft 323. This shaft has a bevel pinion 335 secured to it at its upper end. The pinion 335 meshes with a bevel gear 336 which is secured to a shaft 337 that is journaled in the frame of the machine. There is a spur gear 338 integral with the bevel gear 336. The spur gear 338 meshes with a spur gear 339 which is keyed to a stub shaft 340 that is suitably journaled in the frame of the machine.

There is a spur gear 341 also keyed to the shaft 340. This spur gear 341 meshes with a spur gear 342 that is keyed to a sleeve 343 which is formed on its periphery with ratchet teeth 345 (Figs. 14 and 15).

The sleeve 343 is mounted on a bushing 346 which surrounds the shaft 347.

348 designates a stop-plate which is keyed to the shaft 347 and is recessed to receive and surrounds that portion of the sleeve 343 which is provided with the ratchet teeth 345. The stop-plate is so formed as to provide a portion of reduced diameter that is journaled on the bushing 349 which is secured in the lug 344 that is integral with the frame of the machine.

The shaft 347 is mounted directly in the bushing 352 which is carried in another lug 354 integral with the frame of the machine.

There is a spur gear 355 mounted on the shaft 347 and having a splined connection therewith. This spur gear meshes with a spur gear 356 which has a splined connection with a shaft 357. The shaft 357 is journaled on bushings 358 and 359 in an oscillatable support 351. This support 351 is adapted to rock about the axis of the shaft 347. It has a pair of arms 350 and 353, which extend from its opposite ends and which are journaled, respectively, on the bushings 349 and 352.

There is a link 360 connected at one end to the gear 356 by the eccentric pin 361. The link 360 is connected at its other end to the frame of the machine by a pin 362. There is a spur gear 364 splined to the shaft 357 at the end opposite from that which carries the spur gear 356. The spur gear 364 meshes with the spur gear 365 which has a splined connection to a stub shaft 366 which is journaled in the frame of the machine. A spur gear 367 is also secured to the shaft 366. This spur gear meshes with the large spur gear 275 which, as already described, is secured to the turret 53.

The stop plate 348 is provided with a recess or groove 370 and in this recess or groove there is pivotally mounted a pawl 371 which is adapted to engage with the ratchet teeth 345 of the sleeve 343. The pawl 371 is constantly urged into engagement with the ratchet teeth 345 by a spring-pressed plunger 372 (Fig. 15) which is housed in the stop-plate 348. The pawl 371 is held out of engagement with the ratchet teeth 345 by a stop-dog 374 which is adapted to engage the tail of the pawl 371 to hold the pawl retracted from engagement with the ratchet teeth. This stop-dog 374 is also formed with a ledge-portion 375 that engages a notch in the stop-plate 348 to hold the stop plate against rotation in one direction.

The dog 374 is keyed to a rock-shaft 376 which is mounted in suitable bearings in the frame of the machine. There is a second dog 377 keyed to the shaft 376 and arranged to engage a notch in the stop-plate 348 to hold the stop-plate against rotation in the direction opposite to that in which the dog 374 operates. The two dogs 374 and 377 are normally pressed into operative positions by a pair of spring-pressed plungers 378 which are housed in the frame of the machine.

The dogs 374 and 377 are tripped to release the pawl 371 and stop-plate 348 by operation of the cam 332. There is a roller 380 (Figs. 14 and 15) carried by an arm 381 that is pivotally mounted at 382 on the frame of the machine. The roller 380 is in engagement with the periphery of the cam 332. The rocker-arm 381 carries a button 384 which engages one end of a rod or plunger 385 that slides in a suitable hole or opening drilled in the frame. At its opposite end, the rod 385 contacts an arm 386 which, like the dogs 374 and 377, is keyed to the rock-shaft 376.

The cam 332 is so shaped that once in each revolution of the cam, the rod 385 is forced forward to rock the arm 386 and shaft 376 in a direction to cause the dogs 374 and 377 to be disengaged from the stop-plate 348 and pawl 371. As soon as the pawl is released, it drops into engagement with the teeth of the ratchet wheel 345 under actuation of the spring-pressed plunger 372.

The ratchet wheel is rotating continuously being driven from the motor 320 through the train of gearing 321, 322, 335, 336, 338, 339, 341 and 342 (Figs. 9, 14 and 15). When the pawl 371 drops into engagement with the ratchet wheel, then, the rotation of the ratchet wheel is transmitted through the pawl to the stop-plate 348, thereby driving the shaft 347 to which the stop-plate is keyed. The rotation of the shaft 347 is transmitted through the gearing 355, 356, shaft 357, gearing 364, 365, shaft 366, gearing 367 and 275 to the turret 53 and so the turret is indexed.

The indexing rotation of the turret takes place without shock or jar for the link 360, which is connected to the gear 356, causes the drive to the turret to accelerate gradually and decelerate gradually. As the shaft 347 rotates, the support 351 is swung about the axis of this shaft by operation of the link 360 and as the support 351 swings about the axis of the shaft 347, under actuation of the link 360, a variable motion is imparted to the shaft 357. This varying motion is of such nature that the turret starts at slow speed, runs at maximum speed for a while and then comes to a gradual stop.

The cam 332 is so shaped that it will allow the stop-dogs 374 and 377 to drop back onto the periphery of the stop-plate 348 just before the shaft 347 has completed the number of revolutions required to index the turret through a quarter of a turn. Thus when the notches of the stop plate again register with the stop-dogs, the stop-dogs will snap back into locking position and the dog 374 will disengage the pawl 371 from the ratchet teeth 345. Thus the turret will be stopped. The ratchet member 343 continues to rotate but the pawl is out of position and its rotation is not transmitted to the turret.

The turret is locked in its indexed position by the lock-dog 282 (Fig. 10) and clamping tongues 302 and 303 (Figs. 9 and 11), the cams 295 and 310 (Fig. 14) having returned these parts into operative position.

*Work-spindle indexing mechanisms*

As already described, while a blank is at the roughing station, the milling cutter is alternately fed into and withdrawn from engagement with the blank. On each feed stroke, a tooth space is cut in the blank and on each retractive stroke, the blank is indexed so that on the next feed stroke a new portion of the blank may be in position to have a tooth space cut therein. Likewise, at the finishing station, the planing tools have an alternate movement of feed and withdrawal, the teeth of the blank being cut while the tools are in full-depth position and the blank being indexed during the periods of tool-withdrawal. The mechanism for indexing the blanks at the roughing and finishing stations will now be described.

To each of the four work spindles of the machine, there is keyed an index plate 400 (Figs. 9, 11, 12, 17 and 21). These index plates are identical and each is provided with a number of notches 401 equal to the number of teeth to be cut in the gears being produced on the machine. To each of the four work spindles of the machine there is also keyed a ratchet-wheel 402 (Figs. 9, 11, 12, 18 and 24).

During the periods of cutter feed, the work spindle which happens to be at the roughing station is held against rotation by the lock-dog 403 which is adapted to engage successively in the several notches of the index plate 400 which is secured to that particular work spindle. The locking dog 403 is secured to an arm 404 that is keyed to a shaft 405. The shaft 405 is journaled on anti-friction bearings 406 and 407 (Fig. 23) in the frame of the machine. The locking dog 403 is constantly pressed toward engaging position by a spring-pressed plunger 408 (Figs. 12 and 23) which is housed in the frame of the machine and which abuts against a stud 409 that has a pressed fit into a lug 410 which is integral with the arm 404.

There is a trip-lever 412 (Figs. 12, 21, 22 and 23) also keyed to the shaft 405. This lever carries a trip-stud 413 which has its operating end slabbed off as clearly shown in Figures 21 and 22. The trip lever 412 is slotted at its lower end to form a split clamp and the trip stud 413 is held by this split clamp and the bolt 414.

The trip stud 413 cooperates with a trip dog 415 (Figs. 22 and 25). The trip dog 415 is oscillatably mounted on a pin 418 that threads into the head of a stud 416. The trip dog is constantly urged in one direction by a coil spring 417 which is secured at one end to the trip dog and at its other end to the head of the stud 416.

The stud 416 is adjustably secured in an arcuate slot 423 formed in an arm 424 (Figs. 11 and 22). The arm 424 is keyed to a sleeve 425 that is journaled on the bushings 426 and 427 in the frame of the machine and is, therefore, fixedly mounted relative to the turret.

There is a segment 428 secured to the arm 424 by screws 429. When the arm 424 is rocked in a clockwise direction (Fig. 22), the trip dog 415 will be carried into engagement with the trip stud 413 but will pass idly by the stud compressing the spring 417. When the arm 424 returns, however, moving in the counter-clockwise direction, the trip dog 415 will be held against a ledge 430 (Fig. 22) of the stud 416 and the trip lever 412 will be rocked outwardly, rocking the shaft 405 and lifting the lock-up dog 403 out of engagement with the index plate 400. This releases the work spindle to permit the blank then being roughed to be indexed.

There are a pair of pawls 435 and 436 (Figs. 11 and 24) adapted to cooperate with the ratchet wheels 402 when each work spindle is at the roughing station. The pawl 435 is integral with a stud 437 that is oscillatably mounted in an arm 438. The arm 438 is rotatably mounted on a shaft 440 which is journaled in the sleeve 425. The other pawl 436 is integral with a stud 442 which is oscillatably mounted in an arm 443 which is secured by the screw 444 and dowel-pin 445 to the shaft 440.

The pawls 435 and 436 are, respectively, constantly urged into engagement with the ratchet wheel 402, which is then at the roughing station, by spring-pressed plungers 447 and 448 housed, respectively, in the arms 438 and 443. The pawls 435 and 436 are held out of engagement with the several ratchet wheels 402, during the periods when the cutter is cutting tooth slots in the successive blanks, by a collar-shaped cam member 450 (Figs. 11 and 24). This cam member is provided with an internal cam surface which is adapted to contact the rollers 451 and 452 carried by the tails of the pawls 435 and 436, respectively, and hold these pawls in retracted positions.

The cam member 450 is pivoted on a stud 453 secured in the frame of the machine. The cam member is guided in its pivotal movement by a strap 454, which is secured to the frame of the machine and which engages over the rib 457 formed on the cam member (Figs. 11 and 24).

There is a spring-pressed plunger 458 housed in the frame of the machine (Fig. 12). This plunger contacts a stud 459 carried by an arm of the cam member 450. The spring-pressed plunger tends to rock the cam member 450 about its pivot stud 453 and disengage the cam member from the rollers 451 and 452 of the pawls 435 and 436, but as long as the locking dog 403 is in locking position, the cam member 450 is held in operative position. There is a roller 455 (Figs. 21 and 23) secured in an extension of the arm 404. This roller is adapted to ride on an arcuate track 456 formed on the periphery of the cam 450. The arm 404 is rocked continuously toward locking position by the spring-pressed plunger 408 (Fig. 12) and the pressure of the spring operating this plunger is greater than that of the spring operating the plunger 458. When the lock-dog 403 is rocked out of engagement with the index plate 400 as above described, however, the roller 455 is carried away from the cam 450 and the spring-pressed plunger 458 then rocks the cam 450 about its pivot stud releasing the pawls 435 and 436 and allowing the pawls to engage the ratchet wheels 402 under actuation of their respective spring-pressed plungers 455 and 456. The work spindle at the roughing station is now unlocked and can be rotated by one or other of the pawls 435 or 436 to index it as will be described hereinafter.

Locking and indexing mechanisms very similar in construction and operation to those already described are employed at the finishing station also. There is a lock-dog 465 (Figs. 11 and 17) mounted at the finishing station for engagement with the index plates 400. There are a pair of pawls 466 and 467 (Figs. 11 and 18) adapted to engage the ratchet wheels 402. There is a collar-shaped cam member 468 adapted to engage rollers 469 and 470, respectively, carried by the pawls 466 and 467, respectively, to hold these pawls out of engagement with the ratchet wheel 402 during cutting. There is a trip lever 472 carrying a trip stud 473 and cooperating with a trip dog 474 (Figs. 19 and 20) to disengage the lock-up dog from the index plate for indexing. In details of mounting and operation, there are, however, some differences between the parts which operate at the finishing station and those which operate at the roughing station.

The cradle 176 is held on the ways 174 and 175 (Figs. 6 and 8) by an arcuate gib or strap 480 which is secured to the cradle by screws 481. A bracket 482 extends from this gib in front of the column 141 and is integral with the gib. To this bracket there is adjustably secured a support or standard 483. The bracket 482 is provided on its upper face with a pair of parallel arcuate T-slots 484 curved longitudinally about the apex center of the finishing unit of the machine and the support 483 is secured to the bracket 482 by T-bolts 485 (Figs. 2 and 6) which engage in the T-slots 484.

There is a crown gear segment 486 pivotally mounted on the support 483 for movement about the axis of the pin 487. The support 483 is formed with a way 488 and in its rocking movement, the crown gear segment 486 is guided by a gib or strap 490 which engages the way 488 and is secured to the crown gear segment by screws (not shown).

The crown gear segment 486 meshes with a bevel gear segment 492 (Figs. 2, 11, 12 and 13). The crown gear segment 486 is held in engagement with the bevel gear segment 492 by a roller 493 which is carried by an arm 495 that is pivotally mounted on a post 496 (Fig. 13) which is adjustable on a bracket 497. The member 496 is secured to bracket 497 by T-bolts 498 which engage in a T-slot 499 formed in the upper face of the bracket 497. The bracket 497 is secured to the column 141 by screws 500. A coil spring (not shown) one end of which is secured to the arm 495 and the other end of which is secured to the post 496 serves to hold the roller 493 against the back of the crown gear segment 486 and resiliently hold the crown and bevel gear segments in mesh. The construction of the crown and bevel gear segments and of the roller is substantially the same as that shown in the patent to Finsen No. 1,780,350 of November 4, 1930 and need not be explained further in detail here.

The bevel gear segment 492 is secured to an arm 502 and is radially adjustable thereon, being secured to the arm 502 by bolts 503 which engage in the slots 504 in the arm 502 (Figs. 11 and 12). The arm 502 surrounds a sleeve 505, as clearly shown in Figure 11, and is secured to this sleeve by screws 506. The sleeve 505 is journaled on the bushings 507 and 508 in the frame of the machine. The sleeve 505 serves as a journal for the segment arm 502. The arm 502 is guided in its swinging movement by a way 514 which is secured to the frame of the machine by screws 515. The arm 502 is held on the way 514 by a gib or strap 519 which is secured to the arm 502 by suitable screws 520.

There is a plate 510 secured to the arm 502 for adjustment thereon about the axis of the sleeve 505. The plate is secured in any adjusted position on the arm 502 by the T-bolts 511 (Figs. 11 and 12) whose heads engage in the arcuate T-slot 512 formed in the rear face of the arm 502.

There is a stud or shaft 525 (Figs. 17, 19 and 20) journaled on the plate 510 on anti-friction bearings 526 and 527. The arm 528, which carries the lock-up dog 465, is keyed to this shaft 525. The trip lever 472 is also keyed to this shaft 525. The trip stud 473 is secured to the arm 472 by a split clamp formed by slotting the outer end of the arm 472. The clamp is compressed by the bolt 529. The lock-up dog 465 is constantly urged into engagement with the index plate 400 by a spring-pressed plunger 530 (Figs. 12 and 20) which engages a lug 531 formed integral with the arm 528. The trip dog 474 is pivotally mounted on a stud 532 which is secured to a plate 533 (Figs. 19 and 20) that is, in turn, fastened to the frame of the machine by screws 534. The stud 532 passes through an arcuate slot 535 in the plate 534 and is adjustable about the axis of the sleeve 505 by movement in said slot. The trip dog 474 is secured to the head of the stud 532 by a pin 536 which serves as a pivot for the trip dog. The head of the stud 532 is slotted as indicated at 537 in Figure 19 to receive the trip dog and the trip dog is constantly urged against the lower end wall of this slot 537 by a coil spring 538 (Fig. 20), one end of which is attached to the trip dog and the other end of which is attached to the head of the stud 532.

In the oscillation of the cradle 170, the crown gear segment 486 rolls with the bevel gear segment 492 which is thus rocked about the axis of the sleeve 505. In its rocking movement, the bevel gear segment 492 carries the shaft 525 (Fig. 20) bodily with it and the trip-lever 472 is thus carried bodily also. As the trip lever swings upwardly from the position shown in Figure 19, the trip stud 473 passes by the trip-dog 474 because the dog 474 is forced about its pivot against the resistance of the spring 538. On the return movement of the trip lever 472, however, the trip dog 474 is held against the lower end wall of the slot 537 with the result that the trip lever 472 is rocked outwardly, rocking the shaft 525 and carrying the locking dog 465 out of engagement with the index plate 400.

The cam member 468 is pivotally mounted upon a stud 540 (Figs. 18 and 20) which is secured in the arm 502. It is guided in its pivotal movement by the strap 519 which is secured to the arm 502 and engages over the rib 517 formed on the cam member (Figs. 11 and 18). The cam member is constantly urged in one direction about its stud 540 to release the pawls 466 and 467 by a spring-pressed plunger 542 (Fig. 12). This plunger is housed in the frame of the machine and engages a button 541 carried by the cam member. The cam member 468 is held in operative relation with the pawls, as long as the dog 465 is in engagement with an index plate 400, by the roller 543 (Figs. 18 and 20). This roller is secured by the stud 545 in a lug 544, which is integral with the arm 528. The roller is adapted to ride on the arcuate track 546 formed on the outside of the cam member 468. Thus, as long as the locking dog 465 is in operative position, the cam surface 547 of the cam member 468 is in engagement with the rollers 469 and 470 carried, respectively, by the pawls 466 and 467 and these pawls are held out of engagement with the ratchet wheel 402. As soon as the locking dog 465 is moved to disengaged position, however, the cam member 468 is rocked out of operative position by the spring-pressed plunger 542 and the pawls 466 and 467 drop into engagement with the ratchet wheel 402 under actuation of the spring-pressed plungers 548 and 549, respectively.

The pawl 466 is integral with a stud 550 which is pivotally secured in the arm 551 (Fig. 11). This arm is secured to a shaft 552 by a screw 553 and a dowel-pin 554. The pawl 467 is integral with a stud 555 (Fig. 11) which is pivotally secured in an arm 557 that is rotatable on the shaft 552. The plungers 548 and 549, respectively, are housed in the arms 551 and 557, respectively.

There is a spur gear segment 560 secured to the arm 502 (Figs. 11 and 12) by screws 561. This segment meshes with a spur gear 562 which is secured to the flange 563 of a sleeve 564 by screws 565.

The sleeve 564 is journaled in the frame of the machine on bushings 567 and 568. There is a spur gear 570 keyed to the sleeve 564 and this spur gear meshes on either side with idler gears 571 and 572. These gears 571 and 572 are mounted on bushings which are carried by the studs 573 and 574, respectively, and these studs 573 and 574 are secured in the frame of the machine by nuts 575 and 576, respectively. The idler 571 meshes with a spur gear 578 which has a splined connection with the shaft 552 while the idler 572 meshes with a spur gear 579 which has a splined connection with the shaft 440.

Through the train of gearing just described, the indexing rotation is imparted simultaneously to the work spindles, which happen to be at the roughing and finishing stations, when the locking dogs 403 and 465 (Figs. 21 and 17) are disengaged, respectively, from the index plates 400 on these two work spindles. The trip stud 473 (Figs. 19 and 20) is carried past the fixed trip dog 474 to trip the locking dog 465 (Fig. 17) periodically out of engagement with that index plate, which is at the finishing station, by the oscillation of the segment 492 and, as already described, this segment is oscillated by oscillation of the cradle 170 through mesh of the crown gear segment 486 with the segment 492. The trip dog 415 (Figs. 11 and 22) is carried past the trip stud 413 to cause the locking dog 403 to be disengaged periodically from the index plate of the work spindle, which is at the roughing station, by operation of the gear train comprising the segment 560, the gear 562 and idler 585 (Fig. 12) and the segment 428 (Figs. 11 and 22). It is the pawl 466 (Figs. 11 and 18) which imparts the indexing rotation to the work spindle at the finishing station while it is the pawl 436 (Figs. 11 and 24) which imparts the indexing rotation to the spindle at the roughing station. These two pawls are connected to the shafts 552 and 440, respectively, and, as just described, it is these shafts which are driven to impart the indexing motion to the two work spindles at the roughing and finishing stations.

The two spindles, which happen to be at the cutting stations, are indexed simultaneously. When the locking dogs 465 (Fig. 17) and 403 (Fig. 21) are tripped out of locking position, the cam members 468 (Fig. 18) and 450 (Fig. 24) are swung out of operative positions. The pawls 466 (Fig. 18) and 435 (Fig. 24) are thus released and engage the ratchet wheels 402. The work spindles are then rotated from the motion of the segment 492 as just described. When the trip studs 473 (Fig. 17) and 413 (Fig. 22) clear the trip-dogs 474 (Fig. 19) and 415 (Fig. 22), respectively, the lock-dogs 465 and 403 drop back onto the peripheries of the two index plates 400 and when they arrive at the next notches of the index plates drop into those notches. The return of the lock-dogs to locking positions causes the two cams 468 and 450 to be returned to operative position and the pawls 466 and 435 are disengaged from the two ratchet wheels. The indexing of the two work spindles is complete. The tools feed in again to take new cuts on the blanks and when these cuts are completed, the tools are withdrawn and the blanks are again indexed. So the operations proceed at the two cutting stations. There is first cutting and then indexing.

*Means for unlocking work spindles before indexing the turret and means for positioning the work spindles angularly at the cutting stations*

When the cutting operations at the roughing and finishing stations are completed, the turret is indexed. Before this is done, however, the index dogs, which are mounted on relatively fixed parts of the machine, must be unlocked from the pair of index plates, which are secured to the work spindles then at the cutting stations, because the work spindles and index plates are movable with the turret.

Now when the turret is indexed, the pair of work spindles previously at the roughing and finishing stations are moved to the idle and loading stations, respectively. But no means is provided at either of these stations to hold the work spindles against rotation. There is always a possibility, therefore, that a work spindle carrying a roughed blank may be moved slightly on its axis before it reaches the finishing station or that a work spindle, which has been at the finishing station, may be moved slightly on its axis before it is returned again to the roughing station. In either event, the index plate carried by the spindle would not align properly with the index dog which is to cooperate with it and the blank carried by the work spindle would not be properly centered relative to the cutting tool or tools which are to operate thereon next.

The mechanism provided for disengaging the lock dogs from the index plates carried by one pair of work spindles before indexing the turret and the additional mechanism provided for precisely positioning the other pair of work spindles and the index plates carried thereby in reference to the tools and lock-dogs, after the turret has been indexed, will now be described.

Incidentally, the positioning mechanism serves a second purpose. As already stated, the roughing cutter operates in the tooth spaces of the blanks while the finishing tools operate on opposite sides of a tooth. The result is that a work spindle must be rotated on its axis through half a pitch after it leaves the roughing station so that the roughed blank will be properly centered relative to the finishing tools when the finishing operation begins. Likewise, after a work spindle leaves the finishing station, it must again be rotated through half a pitch to bring it back into proper registry with the indexing parts at the roughing station. The work spindle positioning means is employed to produce these two movements as will hereinafter appear.

Reference has already been made to the cam 331 which is keyed to the shaft 326 (Figs. 12 and 14). There is an arm 590 pivotally mounted in the frame of the machine by means of the stud 591. This arm carries a roller 592 which engages the periphery of the cam 331. There is also a hardened stud 593 secured in the arm 590. This stud contacts with one end of the rod 594 which is mounted to slide in the frame of the machine. At its opposite end, the rod 594 contacts a button 595 (Figs. 12, 21 and 23) which is carried by one arm of a bell crank lever 596. This bell-crank lever is journaled on a stub-shaft 597 which is mounted in the bearing 603 formed on the frame of the machine. The other arm of the bell-crank lever carries a button 598 which contacts the upper end of the rod 599. The bell-crank-lever also carries a third button 600 which is adapted to engage the stud 601 carried by the trip lever 412.

The rod 599 engages at its lower end a stud 602 which is adjustably threaded into one end of a lever 604 that is pivotally mounted at 605 on the frame of the machine. There is a shoe 606 formed on the opposite end of this lever as shown in Figures 12, 19, 17 and 20. This shoe is adapted to engage a stud 607 carried by the trip lever 472. The lever 604 is constantly held in engagement with the rod 599 by a spring plunger 608 (Fig. 12) which is suitably housed in the frame of the machine.

Reference has already been made to the cam 333 which is keyed to the shaft 326 (Figs. 11, 14 and 13). There is an arm 610 pivotally mounted on the stud 611 in the frame of the machine. This arm carries a roller 612 which engages the periphery of the cam 333. The arm also carries a stud 613 which contacts one end of a rod 614 that is slidably mounted in the frame of the machine. The other end of the rod 614 engages the stud 615 carried by an arm 616 which is secured to a shaft 617 that is suitably journaled in the frame of the machine. An arm 618 is mounted on this shaft 617 and has a splined connection therewith. This arm is provided with segment teeth 619 that engage the rack teeth 620 cut in a rod 621. This rod is mounted to reciprocate in a bearing 622 formed integral with the frame of the machine. The length of the rod is such that its rack teeth also engage a segment 624 cut on an arm 625 that has a splined connection with a shaft 626. This shaft is journaled in the sleeve 564 on bushings 627.

There is a gear 628 mounted on the shaft 626 at the end opposite from that which carries the segment arm 625. This gear 628 has a splined connection with the shaft 626. It meshes on opposite sides with segments 631 and 632, respectively, which are cut into the peripheries of the arms 557 and 438, respectively, which carry the pawls 467 and 435, respectively (Figs. 11, 18 and 24).

The shaft 626 is stationary during the cutting operations and is rotated only when these operations have been completed and the turret is to be indexed. The cams 331 and 333 are of the shapes shown in Figures 31 and 32. As the shaft 326 rotates, the cam 331 operates first. It comes into engagement with the roller 592 (Fig. 12), rocking the arm 590 and pushing the rod 594 to the right to rock the bell-crank 596 on its axis. This causes the button 600 (Figs. 21 and 22) carried by the bell-crank to engage the button 601 carried by the trip lever 412, rocking the trip lever 412 and the shaft 405 on which this trip lever is mounted. This rocking motion is transmitted to the arm 404 which is keyed to the shaft 405 and thus the lock-dog 403 is swung out of engagement with the index plate 400 carried by the work spindle then at the roughing station. The rocking motion of the bell-crank 596 is also transmitted to the rod 599 by the button 598 and this rod is moved downwardly. This causes the lever 604 (Figs. 12, 21, 17 and 19) to be rocked about its pivot 605 against the resistance of the spring plunger 608. The shoe 607 is rocked upwardly causing the trip lever 472 to be swung outwardly. Since this trip lever is keyed to the shaft 525 and the arm 528, which carries the lock-dog 465, is also keyed to this shaft 525, the lock dog 465 is, therefore, swung out of engagement with the index plate 400 of the spindle then at the finishing station. Thus, the two lock-dogs 403 and 465 are dis-engaged from the two index plates 400 of the pair of work spindles then at the roughing and finishing stations the same as they would be disengaged if indexing of the work spindles were to take place.

The mechanism for indexing the turret then comes into operation. One pair of work spindles are moved away from the cutting stations and the other pair brought into position. As the pairs of work spindles move away from and into the cutting stations the ratchet wheels 402 carried thereby clear the cooperating pawls.

During the time the turret is being indexed, the levers 596 and 604 continue to hold the lock-dogs 403 and 465 in disengaged positions. When the indexing of the turret has been completed, the lobe of the cam 333 (Figs. 13 and 14) engages the roller 612 carried by the arm 610, rocking this arm about its pivot stud 611. This causes the rod 614 to be moved to the right, rocking the arm 616. Since the arm 616 is secured to the shaft 617 and the arm 618 is secured to the same shaft, the rocker movement is transmitted to the arm 618, causing the rod 621 (Figs. 11 and 13) to be moved to the right through engagement of the segment 619 with the rack 620. As the rod 621 moves to the right, it rocks the arm 625 because of the meshing engagement of the rack 620 with the segment 624 of this arm. Thus the shaft 626 is rocked on its axis and the gear 628 carried by this shaft is also rocked. This imparts a rocking movement to the pawls 467 and 435, respectively (Figs. 18 and 24) for these pawls are carried by the arms 557 and 438 respectively, and the segments 631 and 632 carried by these arms, respectively, mesh with the gear 628.

Now the cam 331 (Fig. 12) is so formed that as soon as the new pair of work spindles has arrived at the cutting stations, the roller 592 drops off the lobe of the cam, releasing the trip levers 412 and 472 (Figs. 21 and 20). The lock-dogs 403 and 465 are moved back immediately, therefore, toward engaging positions. If the work spindles are correctly positioned angularly, the lock-dogs register with notches of the index plates carried by the work spindle and return into locking engagement with the plates. In this event, the pawls 467 and 435 simply rock idly over the ratchet wheels imparting no motion to the work spindles. If, on the other hand, the work spindles are not positioned properly, the lock-dogs 403 and 465 drop onto the peripheries of the index plates 400 and the pawls 467 and 435 engaging the ratchet wheels 402 rotate the work spindles until notches of the index plates have been brought into registry with the lock-dogs. Then the lock-dogs return to locking position and the cams 450 and 468 (Figs. 24 and 18) disengage the pawls 435 and 467 from the ratchet wheels so that for the rest of the movement of the arms 557 and 438, the pawls transmit no motion to the work spindles.

The lock-dogs 403 and 465 being relatively fixed act, therefore, as precision positioning means for the several work-spindles as they arrive successively at the two cutting stations. Hence all blanks are positioned alike at the two cutting stations and cut alike. The set-over of half a pitch between roughing and finishing stations required in order to center the teeth of the roughed blanks correctly relative to the tools at the finishing station is effected by the angular setting of the lock-dog 465. As previously stated, the shaft 525 about which this dog rocks is mounted in a plate 510 (Figs. 12 and 20) which is adjustable angularly about the axis of the work spindle at the finishing station. By adjusting this plate initially so that the dog 465 will engage on index plate 400 at a point spaced angularly half a pitch from the point at which the dog 403 engages the same plate when at the roughing station, the desired set-over of half a pitch will be obtained automatically through the precision positioning action just described. The length of the slot 512 (Fig. 12) is such that the dog 465 can be adjusted through considerable range to take care of gears of a wide variety of tooth numbers.

The cam 330 (Fig. 14) cooperates with a spring-pressed plunger 640 to control the operation of the machine electrically so that the motor 100 which operates the feed mechanisms at the roughing and finishing stations cannot be in operation at the same time with the motor 320 which operates the mechanism for indexing the turret. The spring-pressed plunger 640 is housed in a thimble 642 which is threaded into the frame of the machine. It carries a flanged sleeve 643 which engages the rollers 644 and 645 carried by the arms 646 and 647, respectively, of the switches 648 and 649, respectively. The electrical hook-up between the turret and feed drive motors can be employed whether the machine has an automatic loading mechanism or not, but as the machine shown has an automatic loading mechanism and the motor for driving this mechanism forms part of the electrical circuit of the machine, the electrical hook-up between the turret and feed drive motors will be described later to avoid unnecessary repetition. The loading mechanism will be described next.

*Stripping, loading, and chucking mechanisms*

When each finished gear is brought to the loading station from the finishing station by rotation of the turret, the first operation is to dechuck the finished gear. There is a box 650 mounted on the frame of the machine above the turret 53 (Figs. 1, 39, and 40). There is a rocker-member 652 pivotally mounted at 653 on this box (Fig. 39). This rocker member carries a stud 654 which is adapted to contact the rear end of the pistons or plungers 264 of the several draw-bar releasing mechanisms, as the successive work spindles arrive at the loading station. The rocker member 652 also carries a roller 655 which engages the periphery of the cam 656. This cam is keyed to a shaft 657 which is journaled in the box 650 on anti-friction bearings 658 and 659.

The shaft 657 is driven from a motor 660 that is mounted on top of the box 650. This motor drives the pinion 661 which is connected to the armature shaft of the motor. This pinion 661 meshes with a bevel gear 662 which is keyed to a vertical shaft 663. The shaft 663 is journaled in the box 650 on anti-friction bearings 664 and 665. There is a worm 666 formed integral with the shaft 663. This worm meshes with the worm wheel 668 which is keyed to the shaft 657.

The motor 660 is set in operation periodically as each work spindle successively arrives at the loading station. The cam 656 is a single lobe cam and imparts a rocking motion to the rocker member 652 as it rotates. As the roller 655 rides up the lobe of the cam 656, the plunger 264 is forced forward in the work spindle, compressing the spring 260 and releasing the collet 251 and thereby unclamping the completed gear. The roller 655 is held continuously in engagement with the cam 656 by a spring-pressed plunger 667 which is housed in the box 650. This plunger operates through a lever 669 which is pivoted at 669' on the box 650. One end of the lever engages the rocker member 652. The plunger 669 contacts its other end.

Immediately after the gear is released, it is stripped from the work spindle. The stripper mechanism is operated from the shaft 657 through cams 670 and 671 which are keyed to the shaft 657. The stripper mechanism includes a stripper finger 672 (Figs. 39, 45 and 46). This finger is of forked shape and is secured by screws 673 to a member 674. The member 674 is pivotally connected by the pin 675 with a bar 676 and is also pivotally connected by the pin 677 with a bar 678 having a slot 679 formed therein to receive the pin. The two bars 676 and 678 are mounted in parallelism with one another to slide vertically in the box 650. The bar 676 is provided on one face with rack teeth 680. These mesh with the teeth of a spur pinion 681. The spur pinion 681 is secured to a shaft 682 to which there is also fastened a spur pinion 683. The spur pinion 683 is rotated by a cylindrical rack member 685 which is secured to a rod 686. The rod 686 is adjustably connected by the threaded nipple 687 with an arm 688. The arm 688 is pivotally connected to a lever 690 by a pin 691 that passes through the end of the arm 688 and ears formed on the upper end of the lever 690. The lever 690 is pivotally connected at its lower end with the box 650 by the pin 692. The lever 690 carries intermediate its ends a roller 694 which rides in the trackway of the cam 671 which is an internal cam.

The bar 678 is provided with rack teeth 695 which mesh with a pinion 696 that is secured to a shaft 697 which is suitably journaled in the box 650. There is also a segment 698 secured to the shaft 697. This segment is rotated by a cylindrical rack 699 which is fastened to a rod 700.

The rod 700 is adjustably connected by the threaded nipple 701 with an arm 702. The arm 702 is pivotally connected by the pin 703 with a lever 705. The lever 705 is pivotally mounted on the pin 706 in the box 650. The lever 705 carries a roller 708 which rides on the periphery of the cam 670. The roller is held in contact with the cam by a spring-pressed plunger 710 which presses against the lever 705 and which is suitably housed in the box 650.

The stripper finger 672 normally occupies a position above the work spindle, which is at the loading station, as shown in Figure 39. The paths of the cams 671 and 670 are so shaped as to start rocking the levers 690 and 705 as soon as the completed gear has been unclamped from the work spindle by release of the chucking mechanism. As the lever 690 rocks, it first pushes the arm 688, bar 686 and rack member 685 to the left, rotating the pinions 683 and 681 in a clockwise direction and driving the bar 676 downwardly. As the cam 670 rotates, it rocks the lever 705, pushing the arm 702, rod 700 and rack member 699 to the left. Thus, the pinions 696 and 698 are rocked in a counter-clockwise direction and the bar 678 is forced downwardly.

In the beginning of the rotation of the cam 670, the bar 678 moves very slowly. The member 674, therefore, rocks about the pin 677 as a pivot with the result that the stripper finger 672 is swung behind the gear on the work spindle, as indicated by the dotted line position 672' in Figure 45.

When the finger 672 is positioned behind the gear, the roller 694 begins to travel on a dwell of the cam 671 and the bar 676 is, therefore, stationary. The continued downward movement of the bar 678, therefore, rocks the member 674 about the pivot pin 675 and the completed gear is pushed off of the work spindle. 672 (Fig. 45) shows the final position assumed by the stripper finger and the completed gear is shown at B' in this figure about to drop off of the work spindle.

In the continued rotation of the cams 670 and 671, the bars 676 and 678 are moved upwardly and the parts of the stripper mechanism returned to initial positions.

As soon as the gear has been stripped from the spindle, a new blank is chucked. The blanks are contained in a magazine 715 (Figs. 42, 43 and 44) which is formed with a passage way for the blanks corresponding to the shape of the blanks themselves and which is so arranged that the blanks cannot be placed in the magazine unless they are in the correct position to be chucked when they reach the chucking mechanism. If desired, a button 717 may be threaded into one side of the magazine and a screw 718 into the other side thereof at a directly opposite point so that by adjustment of the screw 718 only blanks of the correct diameter can be admitted to the magazine.

The magazine extends alongside of a depending box or housing 720 (Figs. 42 and 43) which is secured to the box 650 by screws 721. The magazine is secured to a bracket 723 that, in turn, is secured to housing 720. This bracket is provided with a channel that aligns with the channel of the magazine and extends into a channel 724 formed in the box 720. The several channels are so formed that the blank is turned through an angle of approximately 90° from the time it enters the magazine 715 until the time it enters the channel 724 of the box 720.

There are two plungers or bars 725 and 726 mounted one above the other for reciprocating movement in the box 720 (Figs. 39, 40, 41 and 42). The bar 726 is mounted to be in alignment with the work spindles when each is at the loading position. It is formed at the end which is adjacent the work spindle with a pocket shaped to receive one of the blanks to be cut. There is a rest or seat 728 integral with the bar 726 extending beneath the blank receiving pocket in a position to form a rest for the blank in the pocket.

There are a pair of gripping fingers 730 (Figs. 42 and 43) arranged on opposite sides of the pocket in the bar 726 and adapted to cooperate to hold a gear blank in the pocket. These fingers are pivotally mounted upon the bolts 729. A coil spring 732, which is housed in the bar and which presses against the tails of the fingers 730, serves to hold the fingers resiliently in operative position. The distance to which the fingers can close is regulated by adjusting screws 733 which thread into the box 720 from opposite sides thereof and contact the tails of the fingers 730 on sides opposite those contacted by the spring 732.

The plunger 725 is spaced far enough above the plunger 726 to enter the bore of the gear blank which lies in the channel 724 immediately above the blank in the pocket of the plunger 726, see Figure 43. When the plunger 725 is moved forward, then, it enters the bore of the blank above the blank in the pocket of the plunger 726 and prevents this blank from rolling down, as the plunger 726 moves forward to carry the blank in its pocket onto the work spindle, as will be described below.

The two plungers 725 and 726 are actuated from the same cam 735 (Fig. 40). This cam is also secured to the shaft 657. There is a lever 736 (Figs. 39 and 40) pivotally mounted in the frame of the machine on the pin 692. This lever carries a roller 738 which engages the internal trackway of the cam 735. The lever 736 is furcated at its upper end to provide a pair of ears which lie on either side of an arm 740 and the arm 740 is connected to the lever 736 by a pin 741 which passes through the arm and the ears of the lever.

There is a rod 742 threaded into the arm 740. A sleeve 743 is mounted on this rod 742. This sleeve is rectangular in cross-section and slides in a correspondingly shaped guide 745 that is formed integral with the box 650. The sleeve 743 is formed at one side with rack teeth 746. These mesh with the teeth of a spur gear pinion 747 that is secured to a shaft 748 which is journaled in the box 650.

A shaft 750 telescopes into the shaft 748 and is keyed thereto to rotate therewith. This shaft 750 is journaled in the box 720 in alignment with the shaft 748. The shaft 750 has a spur gear 751 secured to it which meshes with the rack teeth 752 (Figs. 40 and 42) cut into one side of the plunger 726.

There is a sleeve 753 keyed to the shaft 750 (Fig. 41) above the pinion 751. This sleeve is formed with a finger 754 that is adapted to engage in a recess or groove 755 formed in the plunger 725.

The sleeve 743 which carries the rack 746 is mounted to slide on the rod 742 but is resiliently connected to the rod 742 so as normally to move therewith, a coil spring 757 being interposed between the end of the sleeve 743 and a nut 758 which is threaded on the rod 742. The purpose of this resilient connection will appear hereinafter.

The plunger 725 is constantly urged toward operative position, that is, to enter the bore of a blank in the channel 724, by a coil spring 758 which is positioned in a recess in the plunger 725 and interposed between the end wall of this recess and a plate 759 which is secured to the box 720.

The cam 735 is so shaped and arranged that it begins to rock the lever 736 as soon as the completed gear has been stripped from the work spindle and the stripper mechanism has been raised clear of the work spindle.

Assuming that the blank labeled $x$ in Figure 43 is in the pocket of plunger 726 and the blank labeled $y$ is directly above it, we shall now describe what happens in the loading operation. As the lever 736 is rocked by the cam 735, the arm 740 is moved to the left, pushing the rod 742 and sleeve 743 with it. The strength of the spring 757 is enough to make the sleeve 743 move with the rod 742 under normal conditions and the rod is only movable independently of the sleeve when an extraordinary condition is encountered where the resilient connection is necessary in order to prevent breakage of the parts. As the sleeve 743 moves to the left, the rack-teeth 746 rotate the pinion 747, thereby rotating the shafts 748 and 750. The movement of these shafts is in a counter-clockwise direction as viewed at Figure 42. The finger 754, therefore, rotates in a counter-clockwise direction, allowing the plunger 725 to move to the right (Fig. 41) under actuation of the spring 758. The plunger 726 also moves to the right as viewed in Figure 42 under actuation of the pinion 751 and rack 752. The length of the groove 755 in the plunger 725 is such, however, that the plunger 725 enters the bore of the gear $y$ before the blank has a chance to drop down because of the movement of the plunger 726. In the further movement of the plunger 726 to the right, the blank $x$ carried by this plunger is pushed over the head 254 (Fig. 16) of the rod 253 and over the fingers 251 of the collapsible collet 250 until the blank seats against the nose 247 of the work arbor. As the blank reaches its full-seated position, the fingers 730 that are holding the blank are released by engaging with the sides of the nose 247 of the work arbor and so the blank is released from the plunger 726.

The cam 656 now allows the member 652 (Fig. 39) to be rocked upwardly about its pivot 653 and the spring 260 returns the draw-bar and collet to chucking position, clamping the new blank rigidly to the work spindle. The cam 735 reverses the direction of movement of the shaft 750. The bar 726 is, therefore, moved back to normal position. As the bar returns, the fingers 730 are forced open and slide over the blank because the blank is held rigidly by the chucking mechanism. As soon as the fingers have moved clear of the blank, however, they are closed again by the action of the spring 732. Just after the bar 726 has reached normal position, the plunger 725 releases the blank $y$ and this blank drops down into the pocket in the plunger 726, ready to be loaded onto the next work spindle in the next loading operation. The other blanks in the magazine 715 and channel 724 roll down following the blank $y$.

A safety device is incorporated in the loading mechanism to insure that each blank is chucked properly on its work spindle before the turret can be indexed. This safety is of an electrical nature and will be described more fully hereinafter. It includes a beveled block 765 (Fig. 40) which is secured by screws 766 to the sleeve 743. This block cooperates with an electrical switch 768 that is secured in a box 769 which is fastened to one side of the box 650. The arm 770 of this switch carries a roller 772 and the switch is operated by engagement of the block 765 with the roller 772.

Means is also provided for interlocking the loading and turret-indexing operations so that the periodic indexing operations of the turret cannot take place until each alternating loading operation has been completed. This interlocking mechanism includes a cam 775 (Figs. 39 and 40) which is adapted to cooperate with a spring-pressed plunger 776 (Fig. 39) that is suitably housed in the box 650. This plunger carries a flanged sleeve 777 which contacts the rollers 778 and 779 which are carried, respectively, by the arms 780 and 781 of the switch 782 and 783, respectively.

Electric circuit of the machine

Assuming that the necessary adjustments have been made and the machine is ready for operation, the operator first starts the motors 66 and 140 which drive, respectively, the roughing cutter C and the planing tools T and T'.

These motors are started by pressing in the normally open start-button 790 (Fig. 47) which may be of any standard construction and may be mounted at any convenient point on the machine.

792, 793 and 794 designate, respectively, the three main lines bringing electric power to the machine from any suitable outside source. When the button 790 is closed, an electrical circuit is made from the line 794 through the terminal 795 of a magnetic controller, which may be of any suitable construction, the line 796 of this controller, the solenoid 797 mounted in the controller, the line 798, breaker 799 and line 800 of the controller, the line 801, the terminals 802 and 803 of the button 790, the terminals 804 and 805 of a normally closed stop-button 806, line 807 and the line 808 to the main line 793.

Simultaneously a circuit is made from the main line 794 through the line 810, the terminal 811 of a second magnetic controller, the line 812, solenoid 813, line 814, breaker 815 and line 816 of this controller, the line 817, the line 801, terminals 802 and 803 of the start-button 790, terminals 804 and 805 of the stop-button 806, and the lines 807 and 808 to the main line 793.

Thus, through closing of the start button 790, the two solenoids 797 and 813 are energized. The energized solenoid 797 pulls in the switch-arms 820, 821, 822 and 823 of the first magnetic controller and these switch-arms make contact with the terminals 824, 825, 795 and 826, respectively, of this controller. The closing of the switch arms 820, 821, 822 and 823 starts the motor 66, which drives the roughing cutter C, for the circuit is now made to this motor from the main line 794 through the terminal 795, switch-arm 822, line 828, line 829, switch-arm 821, and terminal 825 to the line 793, and through the line 830, switch arm 820, and terminal 824 to the main line 792.

The energizing of the solenoid 813 causes the switch arms 832, 833, 834 and 835 of the second controller to be closed. The closing of these switch arms starts the motor 140 which drives the finishing tools T and T'. The circuit to this motor extends from the line 794 through the terminal 811 of the second controller, the switch arm 834, the line 836, the line 837, the switch arm 833, the terminal 838, and the line 808 to the main line 793, and also through the line 839, the switch arm 832, the terminal 840 and the line 841 to the main line 792.

As stated, the button 790 is a normally open button. As soon as the operator takes his hand off of the button, therefore, it flies open. The circuit is maintained to the solenoids 797 and 813, however. The circuit to the solenoid 797 is from the line 794 through the terminal 795, line 796, line 798, breaker 799, line 800, line 801, switch-arm 823, terminal 826, line 843, terminals 804 and 805 of the stop-button 806, line 807, and line 808 to the main line 793. The circuit to the solenoid 813 is from the line 794 through the line 810, terminal 811, lines 812 and 814, breaker 815, lines 816 and 817, switch-arm 835, terminal 845, lines 846 and 843, terminals 804 and 805 of the stop button 806 and lines 807 and 808 to the main line 793. The tool drive motors 66 and 140, therefore run during the whole time that the machine is in operation. To stop these motors, the stop button 806 must be pressed open. This stop button like the button 790 is mounted at a convenient point on the machine.

The closing of the switch arms 820, 821 and 822 enables the operator to put the machine into productive operation. To do this, the operator presses in the normally open start-button 850. This closes a circuit from the line 794 through the terminal 795, the switch-arm 822, the line 851, the terminal 852 of a third controller, the line 853, solenoid 854, line 855, breaker 856, and line 857 of this controller, line 858, terminals 859 and 860 of the start-button 850, line 861, line 862, switch arm 821 and terminal 825 to the main line 793.

Thus, the solenoid 854 is energized and closes the switch-arms 863, 864, 865 and 866 of the third controller. This starts the machine functioning.

As soon as the button 850 is released, it flies open, but the circuit to the solenoid 854 is maintained from the line 794 through the line 851, terminal 852, line 853, line 855, breaker 856, line 857, line 858, switch-arm 866, terminal 868, line 869, overload relay 870, line 871, overload relay 872, line 873, terminals 874 and 875 of a normally closed stop-button 876, line 861 and line 862 to the main line 793. The overload relays 870 and 872 are to prevent overload of the tool drive motors 66 and 140, respectively. These relays may be of any suitable construction.

Assuming that the various parts are in the positions shown in Figure 47, the feed motor 100 will now start. When the switch-arms 863, 864, 865 and 866 are closed, as just described, a circuit is made to a solenoid 880 from the main line 794 through the terminal 795, switch-arm 822, line 851, terminal 852, switch arm 865, line 881, line 882, line 883, line 884, terminals 885 and 886 and bar 887 of the limit switch 648, lines 888 and 889, the solenoid 880, line 890, breaker 891, line 892, arms 893 of a relay selector, and lines 894, 895, 896 and 897, switch arm 864, terminal 898, line 862, switch arm 821 and terminal 825, to the main line 793. The limit switch 648 is one of the two switches controlled by the plunger 640 and cam 330 (Fig. 14), as above described.

The arms 893 of the relay-selector are moved in opposite directions by solenoids 900 and 901.

This selector is of a standard type and is so constructed that when the arms 893 are moved in one direction by one of the solenoids, they will remain in the position to which they are moved by that solenoid, even though that solenoid be de-energized, until the other solenoid is energized to move them in the opposite direction. The arms 893 of the relay are shaped as bell-cranks and when they break contact at the terminals 902 and 903 they make contact at the terminals 904 and 905.

When the solenoid 880 is energized, as above described, it closes the switch arms 907, 908 and 909, causing these arms to make contact with the terminals 911, 912 and 913, respectively. Thus, the circuit is made to the feed motor 100 from the lines 851, 862 and 915 through the switch arms 863, 864 and 865, respectively, the lines 881, 897 and 916, respectively, the switch arms 909, 908 and 907, respectively and the lines 917, 918 and 919, respectively.

During the operation of the feed motor 100, the milling cutter C is alternately fed into the blank at the roughing station and withdrawn from engagement therewith, while the planing tools T and T' are alternately fed into the roughed gear at the finishing station and withdrawn from engagement therewith and the two blanks are indexed during the periods of withdrawal of the cutting tools. Now the feed motor 100 drives the worm wheel 214 (Fig. 8), as above described and this worm wheel drives the generating cam 216 which oscillates the cradle 170. The cradle oscillates once for each tooth of the gear to be generated.

There is a cam-block 920 (Figs. 8 and 47) formed on the web of the worm wheel 214. This cam block 920 is adapted to cooperate with a spring-pressed plunger 922 to control a switch 923. The plunger 922 is mounted to reciprocate in a nipple 924 which threads into the frame of the machine. It is adapted to contact at on end with the cam block 920 and at its other end with a roller 925 carried by the arm 926 of the switch 923. The switch 923 is suitably secured to the frame of the machine.

The worm wheel 214 is keyed to the shaft 215. There is a spur gear 928 also secured to this shaft. This spur gear meshes with a spur gear 929 that is fastened to a shaft 930. The shaft 930 has a spur gear 931 also secured to it and this meshes with a spur gear 932 that is fastened to a stub shaft 934. The shafts 930 and 934 may be carried by a quadrant of standard construction.

There is a cam block 935 provided on the web of the gear 932. This cam block is adapted to engage the roller 936 carried by the switch arm 937 of the double-throw limit switch 938 to thereby control the operation of this switch. This switch is suitably secured to a guard 939 that is in turn secured to the frame of the machine.

The gears 928, 929, 931 and 932 constitute a set of change gears and are so selected that the gear 932 will make one revolution in the time required to finish all of the teeth of a blank, that is, the change gears 928, 929, 931 and 932 are so selected that the gear 932 will make one revolution while the gear 214 is making a number of revolutions equal to the number of teeth to be cut in the blank.

As soon as the circuit to the feed motor 100 is closed, the shaft 215 starts to rotate. The plunger 922 drops off the cam-block 920 and the roller 936 drops off the cam-block 935. As the plunger 922 drops off the cam block 920, the contact-bar 945 of the limit switch 923 breaks contact with the terminals 946 and 947 of this switch for this is a normally open switch. Nothing happens, however, when this occurs, because the relay which comprises the switch-arms 948 and 949 and the solenoids 950 and 951 is at this time open. As the roller 936 drops off the cam block 935, the bar 953 of the switch 938 breaks contact with the terminals 954 and 955 of the switch and makes contact with the terminals 956 and 957.

When the bar 953 makes contact at the points 956 and 957, a circuit is made to the solenoid 950 from the line 881 through the lines 882, 883, 960, 961, 962, terminals 957 and 956 and bar 953, line 963, through the solenoid 950, lines 964, 965, 966, 895 and 896 to the main line 897. This causes the switch arms 948 and 949 to make contact at the terminals 968 and 969, respectfully. Nothing happens, however, because the switch 923 is open.

Now, while the blanks are being cut at the roughing and finishing stations, a blank is being placed on the work spindle at the loading station by the operator or by the loading mechanism in case the automatic loading mechanism is being used. To permit a running description of the electrical hook-up of the machine, it will be assumed that this chucking operation is performed correctly and that the blank is fully seated on the work spindle at the loading station. In this seating operation, the sleeve 743 (Figs. 39, 40 and 47) will move to the full limit of its forward movement in the box 650 and the cam-block 765 carried by this sleeve will engage the roller 772 carried by the arm 770 of the limit switch 768 and close this normally open switch.

A circuit will now be made to the solenoid 980 from the line 881 through the lines 882, 883, 960, 961, terminals 977 and 976 and bar 975 of the switch 768, line 978, the solenoid 980, lines 965, 966, 895 and 896 to the line 897. Thus, the solenoid 980 will be energized and the arms 981 and 982 of the relay, of which these arms and the solenoid are a part, will be moved to make contact at the terminals 983 and 984, respectively. This circuit to the solenoid 980 is made only momentarily, for the cam 735 (Figs. 39 and 40), which controls the movement of the sleeve 743, is rotating continuously during the time of operation of the loading mechanism and the circuit will be broken a moment after it is made by reason of the return of the sleeve 743 and cam-block 765 to their rearward positions. The arms 981 and 982 remain, however, in the positions to which they have been moved by the solenoid 980, for the relay, like the other relays used, is so constructed that once its switch arms have been moved in one direction by one of its solenoids, they remain in the position to which they have been moved, even though the solenoid be subsequently de-energized, until they are positively moved in the opposite direction by action of the other solenoid.

Now, on completion of the loading operation, the cam 775 (Figs. 39 and 40) will have assumed the position shown in Figure 47. Thus, the plunger 776 will be raised and the switch 782 will be closed and the bar 988 of the switch 783 will make contact at the terminals 989 and 990, as shown in Figure 47.

There is a cam block 1000 (Figs. 13 and 47) secured to the plate 502 that carries the segment 492. This cam block is beveled at both ends and is adapted to make contact with a roller 1001 carried by the arm 1002 of a switch 1003 which is mounted upon a bracket 1004 that is secured to the frame of the machine. The switch 1003 is a normally open switch. The segment makes a complete swing-up and down for each tooth of the blank being cut and as it swings in each direction, the roller 1001 rides up on the cam 1000 closing the switch 1003 momentarily and opens it again. Nothing happens, however, as long as the circuit through the line 1008, switch 782, line 992, relay arms 981 and 982, and line 993 remains open at the terminals 905 and 904.

Now while the segment 492 is rocking back and forth, the worm wheel 214 is rotated continuously. It makes one revolution for each tooth that is being cut. As it revolves, the plunger 922 rides up on the cam block 920 and down again. Thus the switch 923 is closed momentarily in each revolution of the worm wheel 214 and opened again an instant later. Nothing happens as long as the bar 953 of the switch 938 is out of contact with the terminals 954 and 955 of this switch.

The switches 923 and 1003 simply continue to make and break contact with each revolution of the worm wheel 214 and each swing of the segment 492, respectively, until the final tooth of the blank has been cut. Then the gear 932 will have rotated far enough to cause the roller 936 to ride up again on the cam block 935, breaking contact at the terminals 956 and 957 and making contact at the terminals 954 and 955.

When the bar 953 breaks contact at the terminals 956 and 957, it breaks the circuit to the solenoid 950, but the relay arms 948 and 949 still remain in contact with the terminals 968 and 969, respectively, as the relay is so constructed that once the arms are moved to one position by energizing one of the solenoids 950 or 951, the arms will remain in that position, even though that solenoid be subsequently de-energized until the arms are positively pulled to the other position by energizing the other solenoid.

When the bar 953 makes contact at the terminals 954 and 955, a circuit will be closed to the relay-selector solenoid 901. This circuit extends from the line 897 through the lines 896, 895 and 970, the solenoid 901, the line 971, the terminal 968, the arms 948 and 949 (which, at this time are closed), the terminal 969, the line 972, the terminals 946 and 947 and bar 945 of the switch 923, the line 973, the terminals 954 and 955 and bar 953 of the switch 938, the lines 974, 962, 961, 960, 883, and 882 to the line 881. The solenoid 901 will, therefore, be energized and reverse the relay-selector arms 893, causing these arms to break contact at the points 902 and 903 and make contact at the points 904 and 905. At the time that this contact is made, a circuit is also completed to the solenoid 951 through the lines 1064, 965, 966, 895, 896 and 897. This latter circuit causes the solenoid 951 to be energized, moving the relay-arms 948 and 949 to break contact with the terminals 968 and 969.

The breaking of contact by the arms 893 at the points 902 and 903 de-energizes the solenoid 880. The switch arms 907, 908 and 909 are, therefore, released and the circuit to the feed motor 100 is broken. The parts are so arranged that the feed motor stops at the moment when the roller 1001 has ridden up on the cam block 1000 carried by the segment 492 so that the segment stops at the center of its roll. The stopping of the feed motor stops the worm wheel 214 and gear 932 and, of course, all of the feed functions of the machine. As will be obvious, the worm wheel stops with the plunger 922 on the cam block 920 and the gear 932 stops with the roller 936 on the cam block 935.

Now, when the relay selector arms 893 break contact at the terminals 902 and 903, they make contact at the points 904 and 905, as above described. A circuit is immediately made, therefore, to the solenoid 1012. This circuit extends from the line 897 through the lines 896, 895, 1010, terminal 904, arms 893, terminal 905, line 993, terminal 984, arms 982 and 981 (which, at this time, are closed as above described), terminal 983, line 992, terminals 987 and 986 and bar 985 of switch 782, line 1008, terminals 1007 and 1006 and bar 1005 of switch 1003, line 1011, breaker 1013, line 1014, through the solenoid 1012, line 1015, terminals 1016 and line 882 to the line 881.

Thus the solenoid 1012 is energized and closes the switch arms 1018, 1019 and 1020.

This makes a circuit from the lines 916, 897 and 881 through the terminals 1022, 1023 and 1016, respectively, the switch arms 1018, 1019 and 1020, respectively and the lines 1024, 1025 and 1026, respectively to the turret drive motor 320. The turret drive motor is thus put into operation.

It will be noted that the relay-selector comprising the arms 893 acts as a positive interlocking mechanism preventing starting of the turret drive motor until the feed motor is stopped.

Now, when the turret drive motor 320 is put in operation, the shaft 326 (Figs. 9 and 13), to which the cam 330 is keyed, starts to rotate. As this cam rotates, the plunger 640 drops off the lobe of the cam and the normally open switch 648 is allowed to open while contact of the bar 1030 of the switch 649 is broken at the points 1031 and 1032 and made at the points 1033 and 1034.

The opening of the switch 648 has no effect. Likewise, when the bar 1030 breaks contact at the points 1031 and 1032, nothing happens for the switch arms 1038 and 1039 are open in the position shown in Figure 47.

When the bar 1030 makes contact, however, at the points 1033 and 1034, a circuit is made to the solenoid 1040. This circuit extends from the line 881 through the lines 882, 883, 960, 1042, terminals 1033 and 1034 and bar 1030 of the switch 649, line 1043, solenoid 1040, lines 1044, 965, 966, 895 and 896 to the line 897. Thus the solenoid 1040 is energized and closes the switch arms 1038 and 1039. Nothing else happens, however, because the circuit from the terminal 1048 through the line 1050 is at this time open at the terminals 1032 and 1031. The turret motor continues to operate, indexing the turret through one-quarter of a turn. During this movement, the cam 330 makes a full revolution. When the cam has returned to the position shown in Figure 47, the plunger 640 is again lifted by the cam to the position shown in that figure and the switch 648 is again closed and the bar 1030 of the switch 649 breaks contact at the points 1033 and 1034 and makes contact at the points 1031 and 1032.

The breaking of contact at the points 1033 and 1034 de-energizes the solenoid 1040, but the arms 1038 and 1039 remain closed, the relay, of which these arms form a part, being constructed in the same way as the relays already described.

When the bar 1030 makes contact at the points 1031 and 1032, a circuit is closed to the solenoid 900. This circuit extends from the line 881 through the lines 882, 883, 960, terminals 1031 and 1032 and bar 1030 of switch 649, line 1050, terminal 1048, arms 1038 and 1039, terminal 1049, line 1047, through the solenoid 900, lines 1052, 895, 896 to the line 897. Thus, the solenoid 900 is energized and the selector relay arms 893 are shifted back to the position shown in Figure 47.

Simultaneously, the current flows from the switch arms 1038 and 1039 through the line 1085, the solenoid 1086, the lines 1087, 965, 966, 895 and 896 to the line 897, energizing the solenoid 1086 and moving the arms 1038 and 1039 to break the contact at the points 1048 and 1049. Simultaneously, also, the current flows through the lines 1085, 1057, the solenoid 1055, the lines 1056, 965, 966, 895 and 896 to the line 897, energizing the solenoid 1055 and pulling the arms 981 and 982 open. Simultaneously, also, the current flows through the lines 1085, 1057, 1058, the solenoid 1060, the lines 1088, 895, 896 to the line 897, energizing the solenoid 1060 and causing the arms 1036 and 1037 to make contact at the terminals 1061 and 1062, respectively. The shifting of the arms 893 back to the position shown in Figure 47 breaks the circuit to the solenoid 1012 and simultaneously makes a circuit to the solenoid 880. The breaking of the circuit to the solenoid 1012 causes the turret drive motor 320 to stop and the making of the circuit to the solenoid 880 causes the feed motor 100 to be re-started. The turret motor stops with the cam 330 in the position shown in Figure 32. As the operation of the parts, after the feed motor is started, has already been described, no further reference to the operation of these parts will be made.

When the switch arms 1036 and 1037 are closed, the solenoid 1035 is energized for a circuit is made to this solenoid from the line 897 through the lines 896, 895, 1089, terminal 1061, arms 1036 and 1037, terminal 1062, line 1068, breaker 1067, line 1066 through the solenoid 1035, lines 1065, 888, terminals 886 and 885 and bar 887 of the switch 648, lines 884, 883 and 882 to the line 881. The energizing of the solenoid 1035 causes the switch arms 1070 and 1071 and 1072 to be closed. Thus, the circuit is closed to the motor 660 which operates the loading mechanism, the lines 1075, 1076 and 1077 of this motor being connected through the switch arms 1070, 1071 and 1072, respectively, and the terminals 1078, 1079 and 1080, respectively, with the lines 1074, 896 and 882, respectively.

The chucking motor revolves the cam 775. When the plunger 776 drops off this cam, the switch 782 is opened and the bar 988 breaks contact at the points 989 and 990 and makes contact at the points 1090 and 1091. Nothing happens when the bar 985 breaks contact because the line is already open at the points 904 and 905. When the bar 988 makes contact at the points 1090 and 1091, however, a circuit is made to the solenoid 998 from the line 897 through the lines 896, 895, 1092, solenoid 998, line 1093, terminals 1090 and 1091 and bar 988 of switch 783, lines 1094, 961, 960, 883 and 882 to line 881. This causes the bars 996 and 997 to make contact at the points 1095 and 1096. Nothing else happens, however, because the circuit from the terminal 1096 through the line 995 is open at the points 989 and 990.

During the loading operation, if the blank is properly placed on the work spindle at the loading station, the cam 765 on the sleeve 743 closes the switch 768, allowing the solenoid 980 to be energized to pull in the arms 981 and 982, as described above. When the loading operation has been completed, the cam 775 returns to the position shown in Figure 47, closing the switch 782 and moving the bar 988 of switch 783 back to make contact with the terminals 989 and 990. A circuit is made, therefore, from the line 881 through the lines 882, 883, 960, 961, 1094, 1097, terminals 990 and 989 and bar 988 of the switch 783, line 995, terminals 1096, switch arms 997 and 996, terminal 1095, lines 1098 and 1099, solenoid 1100, lines 1101, 895 and 896 to the line 897, energizing the solenoid 1100 and opening the switch arms 1036 and 1037. At the same time, the solenoid 999 is energized, a circuit being made through the switch arms 997 and 996, the terminal 1095, the lines 1098 and 1102 through the solenoid 999 to the lines 895, 896 and 897. Thus the switch arms 997 and 996 are re-opened.

The opening of the switch arms 1036 and 1037 breaks the circuit to the solenoid 1035, releasing the switch arms 1070, 1071 and 1072 and stopping the loading motor 660.

The manner in which the feed motor is stopped after the operations at the roughing and finishing stations have been completed, has already been described, as has also, the manner in which the turret index motor is started when the feed motor is stopped.

If because of some discrepancy in size or for some other reason, a blank cannot be chucked properly on the spindle at the loading station, the sleeve 743 will not move to the limit of its forward movement in the box 650 and the cam 765 will not close the switch 768. The chucking mechanism may go through the rest of its cycle under actuation of the chucking motor, because the spring 757 will allow of relative movement of the sleeve 743 on the bar 742 and there is no danger of breakage, but unless the switch 768 is closed during the chucking operation, the turret index motor will not start. The chucking mechanism will simply go through its cycle and then the machine will stop. Provision must be made, therefore, for permitting the operator to chuck a blank should the loading mechanism fail to do so during its cycle. The start button 1105 is provided for this purpose. This is a normally open button. When it is pushed in, a circuit is closed from the line 881 through the lines 882, 883, 884 and terminals 885 and 886 and bar 887 of the switch 648, lines 888, 1106, terminals 1107 and 1108, lines 1109 and 1058, solenoid 1060, lines 1088, 895 and 896 to line 897. This energizes the solenoid 1060 closing the bars 1036 and 1037 to again energize the solenoid 1035 and re-start the chucking motor. If the operator has removed the improperly machined blank and substituted another in its place, the chucking mechanism will now chuck the blank and the machine will continue in its cycle.

An electrically operated brake is provided for each of the motors 320, 100 and 660. These brakes serve to prevent coasting of a motor after the circuit to it has been broken in the operation of the machine.

The three brakes are of identical and usual construction. Each comprises a pair of arms 1125 and 1126 (Fig. 13) adapted to be pulled together to grip the armature shaft of the motor by a coil spring 1127 (Fig. 2). The arms are moved to released position against the resistance of the spring by operation of a solenoid 1128. When the circuit is made to any one of the motors 320, 100 or 660 as described above, the solenoid operating the brake, which is used in conjunction with that motor, is energized, the current being transmitted through lines 1130 and 1131 in the case of the solenoid operating the brake for motor 320, through lines 1132 and 1133 in the case of the solenoid operating the brake for motor 100 and through lines 1134 and 1135 in the case of the solenoid operating the brake for motor 660. When the circuit to any one of the motors is broken, the circuit to the associated solenoid is simultaneously broken and the associated brake is, therefore, immediately applied by spring 1127. So coasting of the motor is prevented.

Overhead tie

To insure greater rigidity, an overhead tie is provided between the generating unit and the central portion of the frame in which the turret is mounted. This tie comprises a plate 1115 and an arm 1116. The plate is secured to the frame above the turret by bolts 1117 (Figs. 1 and 2), while the arm 1116 is secured to the column 141 by bolts 1118. The arm and plate are adjustably connected together by a T-bolt 1119, whose head engages in an arcuate slot 1120 formed in the plate 1115. The slot 1120 is curved about the same center as that about which the slots 226 are curved so that the overhead tie can be adjusted in conformity to the adjustment of the column 141 as determined by the pitch cone angle of the gears to be cut.

General operation of the machine

Before starting the machine, the cutting tools are adjusted in accordance with the diameter, cone distance, tooth-taper and cone angle of the blanks to be cut. The milling cutter C is adjusted by adjustment of the slide 65 on the column 85 and adjustment of the column 85 on the base 50 of the machine, these two adjustments being effected by rotation of the screw shafts 130 and 90, respectively, (Figs. 1, 3 and 4). The planing tools are mounted on the slides 135 and 136 so as to have the usual adjustments for cone distance. The tool arms 137 and 138 are also adjustable angularly on the tool head 139 to incline the tool slides to one another so that the tools will move in paths converging at an angle corresponding to the lengthwise taper of the gear teeth to be cut, the tool arms being secured in adjusted positions by the bolts 162. In addition, the column 141 is adjustable angularly on the base of the machine in accordance with the pitch cone angle of the gears to be cut. The adjustment of the tool head on the carriage 164 is effected by rotation of the screw 167. To adjust the column 141 on the base, the bolts 225 are released and the column moved manually.

When all of the necessary adjustments have been made, the operator starts the motors 66 and 140 which drive the roughing cutter C and the finishing tools T and T', respectively. This is done by pressing in the start-button 790 (Fig. 47 as above described. The roughing cutter C is driven from the motor 66 through the gearing 67, 69, 71, 72, 75, 76, 78 and 79 (Figs. 3 and 4). The motor 140 reciprocates the planing tools T and T' through the gearing 142, 143, 149, 150, the crank-plate 151, the connecting arm 153, the actuating plate 155, the blocks 160 which slide in the slot 158 of the plate 155, and the pins 159 which connect these blocks with the tool slides 135 and 136. The roughing cutter continues to rotate and the planing tools to reciprocate back and forth the whole time that the machine is in operation.

Once he has started the motors 66 and 140, the operator can start the machine to performing its productive functions by pressing in the start button 850 (Fig. 47) as above described. The milling cutter C is fed into the gear blank which is at the roughing station and the reciprocating planing tools T and T' are fed into the roughed gear which is at the finishing station. During its feed, the rotating roughing tool cuts a tooth slot in the blank which is at the roughing station, but the finishing tools T and T', do not ordinarily begin to remove stock until they have reached full depth position. Then the generating roll starts and the finishing tools are rolled over the profiles of opposite side tooth surfaces of a tooth of the blank which is being finished. When a tooth slot has been cut in the blank at the roughing station, the milling cutter is withdrawn from engagement with this blank. When the finishing tools have fully generated a tooth of the blank at the finishing station, they are also withdrawn from engagement with that blank. During the withdrawal of the planing tools, the generating roll is reversed. At a predetermined point in the roll the index mechanism is tripped, unlocking both of the work spindles which are at the cutting stations and thereafter the rolling movement is transmitted to these two work spindles to index both through the angular distance of one tooth. As soon as the indexing operation has been completed, the two work spindles are locked up again. The roughing cutter C again feeds into its blank, cutting another tooth space therein and the finishing tools T and T' are again fed into their blanks for generation of another tooth of that blank.

The alternate movements of feed and withdrawal are imparted to the roughing tool C by reciprocation of the slide 65 on which this tool is mounted. The slide 65 is driven from the motor 100 through the gearing 101, 102, 104, 105, 107, 108, 111, 112, 114, 115, 120, 122, the cam 124 and the roller 125 which is adjustably secured to the slide 65 (Figs. 13, 6, 3 and 4). The alternate movements of feed and withdrawal are imparted to the planing tools T and T' by reciprocation of the carriage 164. The reciprocating movements of the carriage 164 are derived from the rotation of the cam 180 (Fig. 8) which is in engagement with the roller 205 secured to the carriage. The cam 180 is driven from the shaft 106 (Figs. 13 and 6) through the shaft 181, which has a splined telescoping engagement with the shaft 106, the gearing 182, 183, 185, 186, 188, 189, 197 and 198 (Figs. 6, 7 and 8).

The rolling motion required to generate the tooth profiles of the gear at the finishing station is produced by oscillation of the cradle 170 on which the carriage 164 is mounted, and by simultaneous rotation on its axis of the gear, which is at the finishing station. The generating motion of the cradle 170 is derived from the shaft 187 through the gearing 210, 211, 213 and 214, the cam 216, roller 217, lever 218 and turn-buckle 222 (Figs. 7 and 8). As the cradle oscillates, the crown gear segment 486, which is carried by the cradle, imparts an oscillatory motion to the bevel gear segment 492. During cutting, the locking-dog 465 (Figs. 11, 17 and 20), which is mounted on the plate 510 that is secured to the segment 492, is in engagement with a notch 401 of the index plate 400 that is secured to the work spindle, which is at the finishing station. Hence, during cutting, the blank at the finishing station rotates on its axis.

As the segment 492 oscillates, the trip stud 473 (Figs. 17 and 19) is carried into engagement with the trip dog 474. Likewise, as the segment 492 oscillates, the trip dog 415 (Figs. 11 and 22) is carried into engagement with the trip stud 413 (Figs. 22 and 21), the trip dog 415 being oscillated from the segment 492 through the segment 560, the gear 562, the idler 505 and the segment 428 (Figs. 11, 12 and 22). In one direction of oscillation of the segment 492, that is, during cutting, the trip stud 473 passes over the trip dog 474 freely and in this same direction of movement of the segment 492, the trip dog 415 passes freely over the trip stud 413. In the opposite direction of movement of the segment 492, which occurs during withdrawal of the cutting tools from their respective blanks, the trip stud 473 engages the trip dog 474 and the trip lever 472 is rocked outwardly, rocking the rock-shaft 525. In this same movement of the segment 492, the trip dog 415 rocks the trip lever 412 outwardly, rocking the shaft 405. The rocking movement of the shaft 525 disengages the locking dog 465 from the index plate 400 which is secured to the work spindle that is at the finishing station. The rocking movement of the shaft 405 disengages the lock-dog 403 from the index plate 400 of the work spindle which is at the roughing station. Thus, the two spindles at the cutting stations are released.

When the lock dogs 465 and 403 are released, the cam members 468 and 450, respectively, are swung from operative position for the rollers 543 and 455 carried by the arms 528 and 404, respectively, of the lock-dogs, are moved outwardly with the lock-dog and the spring-pressed plungers 542 and 458, respectively, (Fig. 12) are able to rock the cam members outwardly about their pivots 540 and 453, respectively. Thus, the pawls 466 and 436 drop into engagement with the ratchet wheels 402 carried by the two work spindles which are at the cutting stations. The pawls are moved into engagement with the ratchet wheels by the spring-pressed plungers 548 and 448, respectively (Figs. 18 and 24).

The segment 492 continues to move under action of the crown gear segment 486. Motion is now transmitted, however, from the arm 502, which carries the segment 492, through the segment 560, gear 562, sleeve 564 and gear 570 to the gears 571 and 572 (Fig. 11). The gear 571 drives the gear 578 and shaft 552. This shaft carries the arm 551 on which the pawl 456 is mounted and so the rotation of the shaft is imparted to the ratchet wheel 402 and through the ratchet wheel to the work spindle at the finishing station, thus indexing this spindle. At the same time, the gear 572 is driving the gear 579 and shaft 440. This shaft carries the arm 438 on which the pawl 436 is mounted. The ratchet wheel 402 secured to the work spindle, which is at the roughing station, is, therefore, rotated and this work spindle indexed.

When the trip stud 473 drops off the trip dog 474 (Fig. 19), the lock dog 465 (Fig. 17) drops onto the periphery of one index plate 400. When the trip stud 413 drops off the trip dog 415, the lock-dog 403 drops onto the periphery of the other index plate 400. When the pawls 466 and 436 have rotated the two work spindles far enough to bring the notches of the index plates 400 around to the lock dogs 465 and 403, the lock-dogs will drop into these notches and lock up the work spindles again. The work spindle at the finishing station will be locked to the segment 492, as before, while the work spindle at the roughing station will be locked against rotation because the lock-dog 403 is carried on an arm 404 which is secured to a shaft 405 that is journaled in a stationary part of the frame of the machine.

When the lock dog 403 returns to locking position, the cam members 468 and 450 (Figs. 18 and 24) are returned to operative position and the pawls 466 and 436 are disengaged from the two ratchet wheels. The indexing operation on the two spindles are completed.

During the roll of the segment 492 back and forth, the cam block 1000 (Figs. 13 and 47) opens and closes the limit switch 1003. But nothing happens until all of the teeth of the gear blanks have been cut. Each time that the cam 216 (Figs. 8 and 7) makes a revolution, and it makes one revolution for each oscillation of the cradle, the cam block 920 (Figs. 8 and 47) opens and closes the switch 923, but again nothing happens, as stated above, until all of the teeth of the gear blank have been cut. During the time that the cutting operations are going on at the roughing and finishing stations, a completed gear is being taken off of the work spindle at the loading station and a new gear is being chucked on this work spindle. It will be assumed that this operation has been performed correctly and the new blanks properly chucked and that, in the act of chucking the blank, the switch 768 will have been closed momentarily, as described in detailing the electric circuit of the machine. When the last tooth of the blank, which is at the finishing station, has been generated, the worm wheel 214 in its rotation will again close the switch 923, the segment 492 in its oscillation will again close the switch 1003 and the gear 932 (Figs. 8 and 47) will now have been driven far enough by the gearing 928, 929, 931 to bring the cam block 935 into position to return the bar 953 into contact with the terminals 954 and 955 of the switch 938. When these things happen, the feed drive motor 100 is stopped and the turret drive motor 320 is started, as fully described in detailing the electrical circuit of the machine.

The turret drive motor 320 drives the shaft 326 through the gearing 321, 322, 324 and 325 (Figs. 9, 13 and 14). The shaft 326 carries the double cam 296, which is provided with an internal track 310 and an external track 295. This shaft also carries the cams 330, 331, 332 and 333.

The shapes of the cams carried by the shaft 326 are shown in Figures 27 to 32 inclusive and the sequence of operations, as this shaft rotates, is illustrated diagrammatically in Figure 26. As the shaft 326 begins to rotate, the plunger 640 (Figs. 14 and 47) drops off the cam 330 allowing the switch 648 to open and allowing the bar 1030 of the switch 649 to make contact at the points 1033 and 1034, as described in connection with the electrical circuit of the machine. As the shaft 326 rotates, the arm 293 (Figs. 14, 9 and 10) is rocked by the cam 295 through contact of the roller 294 with this cam. The arm 293 rocks the pin 292 and arm 288, withdrawing the lock-dog 282 from the notch 280 of the plate 278, with which this lock-dog had been in engagement. Thus the turret is unlocked.

As the shaft 326 rotates, the cam 332 rocks the arm 590 (Figs. 12 and 14). This moves the rod 594 to the right, rocking the bell-crank lever 596 (Figs. 21 and 23) and through the rod 599, rocking the lever 604. The rocking of the bell-crank lever 596 causes the trip lever 412 to be rocked outwardly, carrying with it the arm 404 on which the lock-dog 403 is mounted. Thus the index plate attached to the work spindle, which has been at the roughing station, is released. As the lever 604 is rocked, the trip lever 472 (Figs. 12, 17 and 19) is rocked, rocking the shaft 525 and arm 526 which carries the lock-dog 465. Thus the index plate which is attached to the work spindle, which has been at the finishing station, is released.

As the shaft 326 rotates, the cam 310 also comes into action, rocking the arm 312, shaft 313, arm 314, link 315, and cam arm 307, releasing the tongues 302 and 303 and unclamping the turret 53 (Figs. 14, 11 and 9).

With the turret lock-dog 282 released, the turret unclamped and the index lock-dogs 403 and 465 (Figs. 21 and 17) released, the cam 332 (Figs. 14 and 15) starts rocking the lever 381. This moves the rod 385 to release the stop-dogs 374 and 377, releasing the stop-plate 348 and the pawl 371. The pawl 371 drops immediately into engagement with the ratchet teeth 345 under actuation of the spring-pressed plunger 372. The ratchet member 345 is already in rotation, for it is driven all the while that the motor 320 is in operation, the drive being through the gearing 321, 322, 335, 336, 338, 339, 341 and 342 (Figs. 9 and 14). Hence, when the pawl 371 drops into engagement with the ratchet member 345, the rotation of the ratchet member is transmitted to the released stop-plate 348, rotating the shaft 347 and through the gearing 355, 356, 364, 365, 367 and 275 driving the turret 53 (Figs. 9 and 14). The crank-arm 366 causes the gears 355 and 364 and the shaft 357 to be moved bodily about the axis of the shaft 347, thus causing the turret to be rotated at a gradually increasing speed and then just before the end of the turret-indexing movement gradually decreasing the speed of movement of the turret again.

The turret is rotated through a quarter of a turn in each indexing cycle. In this movement, the stop-plate 348 makes three turns with the machine geared up as shown in the drawings. In the last revolution of the stop-plate, the roller 380 (Figs. 14 and 15) drops off of the lobe of the cam 332 (Fig. 31). This allows the stop-dogs 374 and 377 to drop back onto the periphery of the stop-plate 348 under actuation of the plungers 378. When the stop-plate 348 has rotated far enough, the stop-dogs 374 and 377 drop back into the notches in the plate, locking the plate against further movement and causing the pawl 371 to be withdrawn from engagement with the ratchet member 345. Thus the rotation of the turret is stopped.

In the rotation of the turret, the work spindle which has been at the loading station is brought to the roughing station, the work spindle which has been at the roughing station is brought to the idle bottom station, the work spindle which has been at the idle bottom station is brought to the finishing station and the work spindle which has been at the finishing station is brought to the loading station. Thus, the newly chucked blank is brought to the roughing station to be roughed out, the roughed blank is brought to the idle station, the previously roughed blank at the idle station is brought to the finishing station to have its teeth finish-generated, and the blank which has been finish-generated at the finishing station is brought to the loading station to be removed from the machine.

Shortly before the stop-plate 348 is locked up, the roller 592 drops off the lobe of the cam 331 (Figs. 12 and 29), and the bell-crank member 596 (Figs. 23 and 21) and the lever 604 (Figs. 12, 17 and 19) are allowed to rock back to their normal positions. This releases the lock-dogs 465 (Fig. 17) and 403 (Fig. 23) and they are again free to return to operative positions under action of the spring-pressed plungers 408 and 542 (Fig. 12).

When the turret 53 has been fully indexed, the cam 295 will have rotated far enough that the roller 294 drops off the lobe of this cam and the arm 293, shaft 294 and arm 284 are so rocked (Figs. 9, 10 and 14) that the lock-dog 282 is returned to locking position to engage the notch 280 of that plate 278 which is now, through rotation of the turret, in position to be engaged. This locks the turret against rotation and an instant later, the arm 312 is rocked by the cam 310 (Figs. 9 and 27) to pull the tongues 302 and 303 back into operative position to clamp the turret again. The turret is now locked up in its new position.

While the turret is being lock up, the cam 333 (Figs. 13 and 32) comes into operation. It rocks the arm 610, forcing the rod 614 to the right, rocking the arms 616 and 618 and through the gearing 619, 620 and 624, rocking the shaft 626. This causes the gear 628 to be rocked, rocking the arms 557 and 438 through the segments 631 and 632 (Figs. 11, 18 and 24). If the index plates 400 of the work spindles, which are newly arrived at the cutting stations, are in proper positions, the locking dogs 403 and 465 will engage notches of these index plates and nothing will happen on rotation of the arms 557 and 438, but if the notches of the index plates are not in alignment with the lock-dogs 403 and 465, the lock-dogs 403 and 465 will drop on the peripheries of these plates and the cam-members 450 and 468 (Figs. 24 and 18) will still be in inoperative position. Hence, when the arms 557 and 433 are rocked, the pawls 467 and 435 will engage the two ratchet wheels 402 carried by the work spindles to rotate the two work spindles. Thus, the index plates attached to the two work spindles will be rotated so that notches of these plates will align with the lock-dogs 403 and 465. Then the lock dogs will engage and lock these plates and the work spindles which carry them. The return of the lock-dogs 403 and 465 to locking positions will cause the cam members 450 and 468 to be returned to operative positions and the pawls 436 and 467, respectively, to be withdrawn from engagement with the ratchet wheels 402. The work spindles, which are now at the cutting station, will thus be correctly positioned and locked.

The cam 330 (Figs. 14, 30 and 47) has now completed its revolution and the plunger 640 again rides up on the lobe of that cam. This returns the bar 1030 of the switch 649 to the position shown in Figure 47 and closes the switch 648. The turret drive motor 320 is stopped and the feed motor 100 and the chucking motor 660 are restarted, as described in connection with the electrical circuit of the machine. The cutting operations on the new blank at the roughing station commence as do the cutting operations on the previously roughed blank which is now at the finishing station. The cutting tools are alternately fed into the blanks and withdrawn and during the periods of withdrawal, the blanks are indexed, all as already described.

At the loading station, the completed gear which has come from the finishing station, is stripped from the work spindle and a new blank positioned thereon. The motor 660 drives the shaft 657 through the gearing 661, 662, 666 and

668 (Figs. 39 and 40). This shaft carries the cams 670, 656, 671, 775 and 735.

As the shaft 657 rotates, the cam 656 starts to rock the member 652 (Figs. 34, 39 and 40). This forces the draw-bar 252 forward in the work spindle, which is at the loading station, against the resistance of the spring 260. Thus, the rod 253 (Figs. 16 and 11) carried by the draw-bar is forced forward and the collet 250 is released, to release the completed gear which is on the work spindle.

As the shaft 657 rotates, the cam 671 also comes into action. This cam rocks the arm 690, causing the stripper positioning or pivot rod 676 to move downwardly under actuation of the arm 688, rod 686, and gearing 685, 683, 681 and 680. This causes the stripper member 672 to pivot about the pin 677 (Figs. 39 and 40). Shortly after, the cam 670 starts to rock the arm 705. This causes the stripper-rod 678 to move downwardly under actuation of the arm 702, rod 700 and gearing 699, 698, 696 and 695.

The movement of the rod 676 positions the stripper 672 behind the completed gear and the movement of the rod 678 causes the stripper member 674 to be swung about the pivot pin 675, stripping the completed gear from the work spindle, see Figure 45.

In the rotation of the shaft 657, the plunger 776 (Figs. 39 and 47) drops off of the lobe of the cam 775. This opens the switch 782 and moves the bar 988 of the switch 783 to make contact at the points 1090 and 1091, as described in connection with the electrical circuit of the machine.

When the completed gear has been stripped from the machine, the shaft 657 will have rotated far enough to cause the cam 735 (Fig. 37) to begin to rock the arm 736. The shaft 750 will be rotated counterclockwise, as viewed in Figures 41 and 42, under actuation of the arm 740, rod 742, sleeve 743 and gearing 746 and 747. The finger 754 (Fig. 41) will be moved far enough to allow the plunger 725 to enter the bore of the blank, which is in the channel 724 immediately above the blank which is carried by the loader member 726. The loader member 726 simultaneously starts rearwardly under actuation of the gearing 751, 752. The rod 725 holds the weight of the blanks in the channel 724 off of the loading member 726 and prevents the lowermost of the blanks in this channel from dropping onto the loading member.

As the loading member 736 moves rearward, the blank carried in the pocket of this member is pushed over the head 254 (Fig. 16) of the rod 253 and over the fingers 251 of the collet 250, providing the bore of the blank is of the correct diameter, for the diameter of the head 254 and of the fingers of the collet, when collapsed, are less than the diameter of the bore of a correctly bored blank. If the blank will not pass over the head 254 and fingers 251, the rod 742 simply moves in the sleeve 743 (Figs. 39 and 40) against the resistance of the spring 757 and no part of the machine is damaged. The sleeve 743 simply fails to move forward far enough to close the switch 768 (Figs. 40 and 47). If the blank is correctly bored, it is pushed on over the head 254 and fingers 251 to seat against the nose 247 of the work arbor and the switch 768 will be closed by the cam block 765.

The cam 656 will now have rotated far enough to allow the member 652 (Fig. 39) to swing upwardly, and the draw-bar 352 will be moved rearwardly in the work spindle under actuation of the spring 260, causing the collet fingers 251 to be expanded and the new blank to be chucked on the work spindle.

The loading member 726 will be returned to the position shown in Figure 42 and the rod 725 will be withdrawn from engagement with the gear blank y (Fig. 43), as soon as the chucking of the new blank and the work spindle has been completed. In the return movement of the bar 726, the fingers 730 will be disengaged from the blank on the work spindle. A new blank y drops into the pocket of the loading member 726 when that member has returned to position and the blank is held therein by the fingers 730. It should be noted that the stripper member 672 is returned to the position shown in Figure 39, immediately after the stripping operation has been completed.

With the continued rotation of the shaft 657, the cam 775 completes a revolution and the plunger 776 (Figs. 39 and 40) is again lifted onto the lobe of this cam. This again closes the switch 782 and moves the bar 988 of the switch 783 to return to contact with the terminals 989 and 990 of the switch 783, as described in connection with the electric circuit. This stops the motor 660 and the shaft 657.

When the roughing and finishing operations at the cutting stations have been completed, the feed motor 100 is stopped and the turret is indexed as described above. The newly loaded blank is brought to the roughing station, the roughed blank is brought to the idle station, the blank at the idle station is brought to the finishing station and the finished gear is brought to the loading station, as described before. Thus the machine proceeds, a gear being removed from the machine and a new blank loaded thereon after each indexing of the turret. When the machine is started up without any blanks being previously in position thereon, it takes four indexes of the turret before a gear is removed from the machine, but thereafter, a gear is taken off after each index of the turret.

While the invention has been described in connection with a machine for producing straight bevel gears, it will be understood that the principles of the invention apply equally to the cutting of other types of gears. In general it may be said that while the invention has been described in connection with a particular embodiment, it is to be understood that it is capable of various modifications and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a machine for producing taper gears, a work support, a plurality of work spindles mounted on a work support, a tool support, two separate tool mechanisms mounted on the tool support comprising, respectively, a rotary milling cutter and a pair of reciprocating planing tools, means for periodically indexing the movable support to cause the two tool mechanisms to be brought progressively into operative relation with the different blanks carried by the different work spindles, means for producing relative feed movements between the two tool mechanisms and the work spindles with which they are, respectively, in operative relation after each periodic movement of the movable support, and means for rotating each work spindle and simultaneously producing a relative translatory movement between said work spindle and the planing tools during the time each work spindle is in operative relation with the planing tools.

2. In a machine for producing taper gears, a work support, a plurality of work spindles mounted in the work support, a tool support, a pair of tool mechanisms mounted on the tool support, one of which is adapted to rough cut and another to finish cut the teeth of a blank, means for periodically indexing one of said supports to bring the work spindles progressively into operative relation with the tool mechanisms, means operative after each index of the movable support for producing relative feed movements between the two tool mechanisms and the blanks with which each is then in operative relation and means for rotating each work spindle and simultaneously producing a relative translatory movement between the work spindle and the finishing tool mechanism during the time each work spindle is in operative relation with the finishing tool mechanism.

3. In a machine for producing gears, a tool support, a pair of tool mechanisms mounted on the tool support, one of which is adapted to rough cut and the other to finish cut the teeth of a blank, a work support, a plurality of pairs of work spindles mounted on the work support, means for periodically indexing one of the supports to bring the different pairs of work spindles progressively into operative relation with the tool mechanisms, means operable after each index of the turret for producing alternate relative movements of feed and withdrawal between the tool mechanisms and the pair of work spindles with which they are then in operative relation and for producing a relative rolling movement between the finishing tool mechanism and the work spindle with which it is then in operative relation, and means operable by the relative rolling motion for indexing both work spindles during the periods of withdrawal.

4. In a machine for producing gears, a work support, a plurality of work spindles mounted on the work support, a tool support, a pair of tool mechanisms mounted on said tool support, one of which is adapted to rough cut and the other to finish cut the teeth of a gear blank, mechanism mounted on said tool support for loading blanks on said work spindles, means for periodically indexing one of said supports to bring the work spindles progressively into operative relation with said loading and tool mechanisms, means for producing relative feed movements between the tool mechanisms and two of the work spindles after each index of the movable support, means for simultaneously operating the loading mechanism to load a blank on a third work spindle, means for interlocking the feed and index mechanisms so that feed and index operations cannot occur simultaneously, and means for interlocking the loading and index mechanisms so that indexing will not occur until the blank has been properly chucked on the third work spindle by the loading mechanism.

5. In a machine for producing gears, a work spindle, a forked stripper-member, means for moving said stripper-member from a position at one side of said work spindle to a position behind a blank on said work spindle, and means for subsequently moving said stripper member forward of said work spindle to strip the blank from said spindle.

6. In a machine for producing gears, a work spindle, a forked stripper-member, a pair of rods to which said stripper-member is pivotally connected at two separated points, means for reciprocating said rods independently of one another to cause said stripper-member to first pivot on one of said rods and then on the other whereby to first position said stripper-member behind a blank on said work spindle and then force said blank off the work spindle.

7. In a machine for producing gears, a tool support, a plurality of tool mechanisms mounted on said tool support, a rotatable turret, a plurality of work spindles mounted on said turret, means for periodically moving said turret to bring the different work spindles progressively into operative relation with the tool mechanisms, means for periodically indexing the work spindles during the periods they are in operative relation with the different tool mechanisms, each indexing mechanism including a part which has a fixed relation to a tool mechanism, parts carried by each work spindle adapted to cooperate with the relatively fixed parts of the index mechanisms when the work spindles are in operative relation with the tool mechanisms, means for disconnecting the two parts of each index mechanism from one another prior to each movement of the turret, and means for rotating the work spindles on their axes after each movement of the turret to cause the parts of the index mechanisms, which are carried by the work spindles newly moved into operative relation with the tool mechanisms, to register with and engage the parts of the index mechanisms which have a fixed relation to the tool mechanisms.

8. In a machine for producing taper gears, a rotary turret having a plurality of work spindles mounted thereon, a roughing tool mechanism comprising a tool support mounted at one side of said turret, a slide reciprocable on said tool support, and a rotary milling cutter journaled in said slide, a finishing tool mechanism comprising a second tool support mounted at the other side of said turret, a cradle oscillatable in second tool support, a slide reciprocable on said cradle, and a pair of planing tools mounted on said second slide and reciprocable thereon in paths converging in accordance with the lengthwise taper of the gear to be cut, means for rotating the turret to bring the different work spindles progressively into operative relation with the two tool mechanisms, and means automatically connectible to the work spindles, as each successively is moved by rotation of the turret into operative relation with the finishing tool mechanism, for rotating each work spindle in timed relation to the cradle oscillation during the time said work spindle is in operative relation with the finishing tool mechanism.

9. In a machine for producing taper gears, a rotary turret having a plurality of work spindles mounted therein, a roughing tool mechanism comprising a tool support mounted at one side of said turret, a slide reciprocable on said tool support and a rotary milling cutter journaled in said slide, finishing tool mechanism comprising a second tool support mounted at the other side of said turret, a cradle oscillatable in said second tool support, a slide reciprocable on said cradle, and a pair of planing tools mounted on said slide and reciprocable thereon in paths converging in accordance with the lengthwise taper of the gears to be cut, means for rotating the turret to bring the different work spindles progressively into operation with the two tool mechanisms, means automatically connectible to the work spindles, as each successively is moved by rotation of the turret into operative relation with the finishing tool mechanism, for rotating each work spindle in timed relation to the cradle oscillation during the time the work spindle is at the finishing position, and means for indexing the work spindles periodically during the time each is in operative relation with a tool mechanism, said means being operated by said cradle movement.

10. In a machine for producing gears, a tool mechanism for rough-cutting the tooth slots of a gear blank, a separate tool mechanism comprising a pair of reciprocating planing tools for finish cutting opposite tooth sides of the blank, a work support on which the blank is mounted, means for actuating the two tool mechanisms, means for automatically moving the work support from tool mechanism to tool mechanism, means for producing a relative rolling movement between the work support and the planing tools when the work support is in operative relation to the planing tools, and means for indexing the work support while in operative relation with either tool mechanism.

11. In a machine for producing gears, a tool mechanism for rough-cutting the tooth slots of a gear blank, a separate tool mechanism for finish cutting the sides of the teeth of a blank, a rotatable work support, means for moving the work support from tool mechanism to tool mechanism, and means for rotating the work support on its axis and simultaneously producing a relative translatory movement between the work support and the finishing tool mechanism about an axis intersecting the axis of the work support, when the work support is in operative relation to the finishing tool mechanism.

12. In a machine for producing tapered gears, a tool mechanism for rough-cutting the tooth slots of a gear blank, a tool mechanism for finishing the sides of the teeth, a plurality of rotatable work supports, a rotatable turret upon which the work supports are journaled with their axes parallel to the axis of the turret, a rotatable cradle mounted with its axis at an angle to the axis of the work supports and on which the finishing tool mechanism is mounted, means for automatically rotating the turret periodically to bring the work supports successively into operative relation with the two tool mechanisms, means for rotating the cradle, means for rotating each work support in time with the cradle rotation when each work support is at finishing position, and means for actuating the tool mechanisms.

13. In a machine for producing gears, a tool mechanism for rough-cutting the tooth slots of a gear blank, a tool mechanism for finishing the sides of the teeth, a plurality of rotatable work supports, a rotatable turret upon which the work supports are journaled with their axes parallel to the axis of the turret, a rotatable cradle on which the finishing mechanism is mounted, said cradle having its axis disposed at an angle to the axis of the work support, a segmental gear secured to the cradle to move therewith, a second segmental gear meshing with the first gear, means for rotating the turret periodically to bring the work supports successively into operative relation with the two tool mechanisms, means for automatically connecting each work support to the second segment when the work support is in operative relation with the finishing mechanism, means for oscillating the cradle, means for actuating the tool mechanisms, and means for indexing the work support while in operative relation with either tool mechanism.

14. In a machine for producing gears, a plurality of tool mechanisms, a plurality of rotatable work supports, a rotatable turret upon which the work supports are journaled, a movable carrier on which one of the tool mechanisms is mounted, means for automatically rotating the turret periodically to bring the work supports successively into operative relation with the several tool mechanisms, an oscillatable member, a geared connection between the oscillatable member and the carrier whereby on movement of the carrier, said oscillatable member is oscillated, means adapted to connect each work support to the oscillatable member when each work support is in operative relation to the finishing mechanism, means for actuating the tool mechanisms and means for actuating the carrier to impart a relative generating movement between the finishing mechanism and each work support while in finishing position.

15. In a machine for producing gears, a plurality of tool mechanisms, a plurality of rotatable work supports, a rotatable turret upon which the work supports are journaled, a movable carrier upon which one of the tool mechanisms is mounted, means for rotating the turret periodically to bring the work supports successively into operative relation with the several tool mechanisms, an oscillatable member, means connecting the oscillatable member to the carrier whereby on movement of the carrier, the oscillatable member is oscillated, means carried by the oscillatable member for connecting each work support to the same when each work support is in finishing position, means for periodically disconnecting a work support from the oscillatable member to permit of indexing said work support while in finishing position, means for normally holding each work support against rotation while in roughing position and means for periodically releasing said holding means and simultaneously connecting the oscillatable member to a work support to periodically index the work support while in roughing position.

16. In a machine for producing gears, a plurality of tool mechanisms, a plurality of work supports, a rotatable turret on which the work supports are mounted, means for automatically rotating the turret periodically to bring the work supports successively into operative relation with the several tool mechanisms and a motor for driving said last named means, means for producing relative feeding movements between the tool mechanisms and the work supports when the work supports are in cutting position and a motor for actuating said feeding mechanism, and means for electrically interconnecting the feed and turret drive motors whereby one motor must be stopped before the other can be started.

17. In a machine for producing gears, a plurality of tool mechanisms for performing different operations on a gear blank, a plurality of work spindles, means for automatically loading gear blanks on the work spindles, a rotary turret on which the work spindles are mounted and means for periodically rotating the turret to bring the work spindles successively into operative relation with the tool mechanisms and the loading mechanism, and means controlled by operation of the loading means for positively interlocking the loading means and the mechanism for rotating the turret so that rotation of the turret cannot take place until a blank has been properly chucked on a work spindle at the loading position.

18. In a machine for producing gears, a frame, a tool mechanism mounted on the frame for performing operations on a gear blank, a work support, a magazine adapted to contain a plurality of gear blanks, a loading mechanism for transferring individual blanks from the magazine to the work support, said loading mechanism comprising a pair of relatively slidable members, resilient means normally operative to cause said members to move together to effect a loading operation but permitting relative movement between said members if a gear blank carried by the loading mechanism will not fully seat on the work spindle, means for actuating one of said slidable members to cause the other to effect the loading operation, and means carried by the latter slidable member operable to render the tool mechanism operative only when there has been no relative movement between said slidable members in the loading operation.

19. In a machine for producing gears, a frame, a plurality of tool mechanisms mounted on the frame, a plurality of work supports, a rotatable turret on which the work supports are mounted, a magazine adapted to contain a plurality of gear blanks, a loading mechanism for transferring individual blanks from the magazine to the work support, said loading mechanism comprising a pair of relatively slidable members, resilient means normally operative to cause said members to move together but permitting relative movement between said members if a gear blank carried by the loading mechanism will not fully seat on a work support, means for rotating the turret to move the work support from the loading mechanism to the tool mechanism and back to the loading mechanism, a normally open switch controlling the operation of the turret-rotating means, means for actuating one of the slidable members to cause the other to effect the loading operation and means carried by the latter member operable to close said switch only when there has been no relative movement between said members in the loading operation.

20. In a machine for producing gears, a tool mechanism for roughing tooth slots of a blank, a tool mechanism for finishing sides of the teeth comprising a pair of tools operable, respectively, on opposite sides of a tooth, a plurality of work spindles, a rotatable turret on which the work spindles are mounted, means for rotating the turret periodically to move the work spindles from tool mechanism to tool mechanism, and means for rotating each work spindle slightly when it is moved from one tool mechanism to another to precisely position each work spindle with reference to the tool mechanism which is to operate next on the blank carried by the work spindle.

21. In a machine for producing gears, a frame, a tool mechanism for roughing tooth slots of a gear blank, a tool mechanism for finishing sides of the teeth comprising a pair of tools operable respectively on opposite sides of a tooth, a plurality of work spindles, a rotatable turret on which the work spindles are mounted, a notched index plate secured to each work spindle, a pair of locking dogs mounted on the frame and having, respectively, a fixed relation to the roughing and finishing tool mechanisms, said dogs being adapted to engage the index plates to lock the work spindles against indexing movement when the work spindles are at the roughing and finishing positions and one of said dogs being adjustable to position it so that it will engage an index plate at a point half a pitch away from the point at which the other dog engages said index plate, means for periodically rotating the turret to move the work spindles from roughing to finishing positions, means for rotating the work spindles during the turret movement to permit the locking dogs to correctly engage the notched plates, and means for periodically disengaging said dogs from said plates to permit indexing of the work spindles.

22. In a machine for producing gears, a work spindle, a magazine adapted to contain a plurality of gear blanks stacked vertically above one another, a reciprocable plunger, means mounted on said plunger for holding the lowermost blank in said stack to permit transfer of said blank to the work spindle on movement of said plunger, a second plunger mounted above the first, means carried by the second plunger for engaging the blank immediately above the lowermost and means for reciprocating the two plungers, said last named means being operable to cause the second plunger to engage its blank before the first plunger is moved whereby to prevent interference of the blanks in the magazine with the transfer operation.

23. In a machine for producing gears, a work spindle, a magazine adapted to contain a plurality of gear blanks arranged vertically above one another, a reciprocable plunger mounted in axial alignment with the work spindle and having a plunger therein in communication with the magazine and adapted to receive a blank from said magazine, said plunger being reciprocable to transfer the individual blanks to the work spindle, a second plunger mounted above the first and reciprocable independently thereof to enter the bore of the blank in the magazine immediately above the pocket, and means for reciprocating said plungers to cause the second plunger to enter the bore of its blank slightly in advance of the movement of the first plunger whereby to hold the blanks in the magazine during loading movement of the first plunger and to cause the second plunger to be withdrawn from its blank when the first plunger has returned to inoperative position.

24. In a machine for producing gears, a frame, a turret rotatably mounted on the frame, a rough-cutting tool mechanism adapted to cut simultaneously the two sides of a tooth space, and a finish-cutting tool mechanism adapted to cut simultaneously the two sides of a tooth of a blank, a plurality of work spindles journaled in the turret, means for periodically rotating the turret to bring the work spindles successively into operative relationship with the two tool mechanisms, and means for rotating each work spindle through a slight distance during rotation of the turret to position the work-piece carried thereby in correct operative relationship with the tool mechanism next to operate on it.

25. In a machine for producing gears, a roughing tool mechanism, a finishing tool mechanism, a rotatable cradle upon which the finishing tool mechanism is mounted, a rotatable turret, a plurality of work spindles rotatably mounted in the turret, means for periodically indexing the turret to bring the work spindles successively into operative relation with the tool mechanism, said work spindles being so positioned in the turret that when a work spindle is in operative relationship with the finishing tool mechanism, the axis of said spindle is angularly disposed to the axis of the cradle, means for actuating the tool mechanism, and means for rotating each work spindle and the cradle in timed relation when the work spindle is in operative relation with the finishing tool mechanism.

26. In a machine for producing gears, a roughing tool mechanism, a finishing tool mechanism, a rotatable cradle upon which the finishing tool mechanism is mounted, a rotatable turret, a plurality of work spindles rotatably mounted in the turret, means for periodically indexing the turret to bring the work spindles successively into operative relationship with the tool mechanism, said work spindles being so positioned on the turret that when a work spindle is in operative relation with the finishing tool mechanism, the axis of said spindle is angular disposed to and intersecting the axis of the cradle, means for actuating the tool mechanism, and means for rotating each work spindle and the cradle in timed relation when the work spindle is in operative relation with the finishing tool mechanism.

27. In a machine for producing gears, a roughing tool mechanism, a finishing tool mechanism, a rotatable cradle upon which the finishing tool mechanism is mounted, a rotatable turret, a plurality of work spindles rotatably mounted in the turret, means for periodically indexing the turret to bring the work spindle successively into operative relationship with the tool mechanism, said work spindles being so positioned in the turret that when a work spindle is in operative relationship with the finishing tool mechanism, the axis of said spindle is angularly disposed to the axis of the cradle, means for actuating the tool mechanism, means for rotating the work spindle and the cradle in timed relation when the work spindle is in operative relation with the finishing tool mechanism, and means actuated by the rotation of the cradle for periodically indexing the work spindles which are in operative relation with the two tool mechanisms.

28. In a machine for producing gears, a tool mechanism for rough-cutting the slots of a gear blank, a separate tool mechanism comprising a pair of reciprocating planing tools for finish-cutting simultaneously opposite sides of a tooth of the blank, a work spindle on which the blank is mounted, means for actuating the two tool mechanisms, means for automatically moving the work spindle from tool mechanism to tool mechanism, means for producing a relative rolling movement between the work spindle and the planing tools, when the work spindle is in operative relationship to the planing tools, means for indexing the work spindle while in operative relation with either tool mechanism, and means for rotating the work spindle through a slight angle during rotation of the turret to correctly position the blank in operative relation with the tool mechanism next to operate thereon.

OLIVER F. BAUER.
WILLIAM R. CARPENTER.